United States Patent
Vink et al.

(10) Patent No.: US 10,623,627 B2
(45) Date of Patent: Apr. 14, 2020

(54) SYSTEM FOR GENERATING A SYNTHETIC 2D IMAGE WITH AN ENHANCED DEPTH OF FIELD OF A BIOLOGICAL SAMPLE

(71) Applicant: KONINKLIJKE PHILIPS N.V., Eindhoven (NL)

(72) Inventors: Jelte Peter Vink, Waalre (NL); Bas Hulsken, Eindhoven (NL); Martijn Wolters, Eindhoven (NL); Marinus Bastiaan Van Leeuwen, Eindhoven (NL); Stuart Hamish Shand, Best (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/078,046

(22) PCT Filed: Feb. 22, 2017

(86) PCT No.: PCT/EP2017/053965
§ 371 (c)(1),
(2) Date: Aug. 21, 2018

(87) PCT Pub. No.: WO2017/144482
PCT Pub. Date: Aug. 31, 2017

(65) Prior Publication Data
US 2019/0075247 A1    Mar. 7, 2019

(30) Foreign Application Priority Data
Feb. 22, 2016 (EP) .................................... 16156763

(51) Int. Cl.
*H04N 5/232* (2006.01)
*G02B 21/36* (2006.01)
(Continued)

(52) U.S. Cl.
CPC ..... *H04N 5/232133* (2018.08); *G02B 21/008* (2013.01); *G02B 21/367* (2013.01); *G06T 5/003* (2013.01); *G06T 5/50* (2013.01)

(58) Field of Classification Search
CPC ............ H04N 5/232133; G02B 21/008; G02B 21/367; G06T 5/003; G06T 5/50
See application file for complete search history.

(56) References Cited

U.S. PATENT DOCUMENTS

| 4,141,032 A | 2/1979 | Haeusler |
| 6,553,141 B1 | 4/2003 | Huffman |

(Continued)

FOREIGN PATENT DOCUMENTS

| WO | WO2009120718 A1 | 10/2009 |
| WO | WO2011080670 A1 | 7/2011 |

(Continued)

OTHER PUBLICATIONS

Boyde, A. et al., "Improved Digital Sem of Cancellous Bone: Scanning Direction of Detection, Through Focus for In-Focus and Sample Orientation", J Anat. Feb. 2003; 202(2): 183-194. http://www.ncbi.nlm.nih.gov/pmc/articles/PMC1571076/.

(Continued)

*Primary Examiner* — Mishawn N. Hunter
(74) *Attorney, Agent, or Firm* — Sherry Austin

(57) ABSTRACT

The present invention relates to a system for generating a synthetic 2D image with an enhanced depth of field of a biological sample. It is described to acquire (110) with a microscope-scanner (20) first image data at a first lateral position of the biological sample and second image data at a second lateral position of the biological sample. The microscope-scanner is used to acquire (120) third image data at the first lateral position and fourth image data at the second lateral position, wherein the third image data is (Continued)

acquired at a depth that is different than that for the first image data and the fourth image data is acquired at a depth that is different than that for the second image data. First working image data is generated (130) for the first lateral position, the generation comprising processing the first image data and the third image data by a focus stacking algorithm. Second working image data is generated (140) for the second lateral position, the generation comprising processing the second image data and the fourth image data by the focus stacking algorithm. The first working image data and the second working image data are combined (150), during acquisition of image data, to generate the synthetic 2D image with an enhanced depth of field of the biological sample.

18 Claims, 10 Drawing Sheets

(51) Int. Cl.
*G06T 5/00* (2006.01)
*G06T 5/50* (2006.01)
*G02B 21/00* (2006.01)

(56) References Cited

U.S. PATENT DOCUMENTS

| | | | |
|---|---|---|---|
| 6,711,297 | B1 | 3/2004 | Chang |
| 9,373,168 | B2 | 6/2016 | Van Leeuwen |
| 2003/0184730 | A1* | 10/2003 | Price .................. G01N 21/6458 356/39 |
| 2003/0222197 | A1* | 12/2003 | Reese .................. G02B 21/367 250/206 |
| 2005/0089208 | A1 | 4/2005 | Dong |
| 2009/0221920 | A1* | 9/2009 | Boppart ............... A61B 5/0066 600/476 |
| 2009/0231689 | A1 | 9/2009 | Pittsyn |
| 2009/0295963 | A1 | 12/2009 | Bamford |
| 2011/0090327 | A1* | 4/2011 | Kenny ................ G02B 21/367 348/79 |
| 2011/0157349 | A1 | 6/2011 | Yamamoto |
| 2012/0176489 | A1 | 7/2012 | Oshiro |
| 2012/0287256 | A1 | 11/2012 | Hulsken |
| 2013/0016885 | A1 | 1/2013 | Tsujimoto |
| 2014/0125776 | A1 | 5/2014 | Damaskinos |
| 2014/0293117 | A1 | 10/2014 | Murakami |
| 2014/0347628 | A1* | 11/2014 | Martinez Corral ...... A61B 3/12 351/206 |
| 2015/0309299 | A1 | 10/2015 | Watanabe |
| 2015/0377777 | A1* | 12/2015 | Ben-Levy ............. G01N 21/41 435/29 |

FOREIGN PATENT DOCUMENTS

| | | |
|---|---|---|
| WO | WO2011161594 A1 | 12/2011 |
| WO | WO2013008121 A1 | 1/2013 |
| WO | WO2013040686 A1 | 3/2013 |

OTHER PUBLICATIONS

Focus Stalking, Wikipedia https://en.wikipedia.org/wiki/Focus_stacking, downloaded from the Internet Aug. 15, 2018.
"All Focused Image by Focal Stacking", roman10, Apr. 12, 2011 http://www.roman10.net/all-focused-image-by-focal-stacking/.
PCT International Search Report, International application No. PCT/EP2017/053965, dated Apr. 28, 2017.
Observations on the PCT International Search Report and the Written Opinion of International Application No. PCT/EP2017/053965, dated Mar. 7, 2018.

* cited by examiner

Parallelelepiped compensation

Z-layer orientation on slide

SYSTEM FOR GENERATING A SYNTHETIC 2D IMAGE WITH AN ENHANCED DEPTH OF FIELD OF A BIOLOGICAL SAMPLE

CROSS-REFERENCE TO RELATED APPLICATIONS

This application claims the priority benefit under 35 U.S.C. § 371 of International Patent Application No. PCT/EP2017/053965, filed Feb. 22, 2017, which claims the benefit European Patent Application No. EP16156763.1, filed Feb. 22, 2016. These applications are hereby incorporated by reference herein in their entirety.

FIELD OF THE INVENTION

The present invention relates to a system for generating a synthetic 2D image with an enhanced depth of field of a biological sample, to a method for generating a synthetic 2D image with an enhanced depth of field of a biological sample, as well as to a computer program element and a computer readable medium.

BACKGROUND OF THE INVENTION

In traditional cancer diagnosis, (histo-)pathological images of tissue samples are visually analysed by pathologists. Using a microscope, the pathologist inspects the tissue. As these samples contain 3D structures and the depth of field of the microscope is limited, not all parts will be in focus. By turning the focus knob, the pathologist is able to go through the tissue in the z-direction (i.e. depth direction). However, using a digital microscope, the tissue samples are automatically scanned. In case the tissue is scanned at a single depth, not all parts of the tissue can be in focus. Scanning the slides at multiple depths leads to the acquisition and storage of a significant amount of data.

US2005/0089208A1 describes a system and method for obtaining images of a microscope slide.

SUMMARY OF THE INVENTION

It would be advantages to have an improved technique for generating an image of a biological sample to be visually analyzed by pathologists.

The object of the present invention is solved with the subject matter of the independent claims, wherein further embodiments are incorporated in the dependent claims. It should be noted that the following described aspects of the invention apply also for the system for generating a synthetic 2D image with an enhanced depth of field of a biological sample, the method for generating a synthetic 2D image with an enhanced depth of field of a biological sample, and the computer program element and the computer readable medium.

According to a first aspect, there is provided a system for generating a synthetic 2D image with an enhanced depth of field of a biological sample, the system comprising:

a microscope-scanner; and a processing unit.

The microscope scanner is configured to acquire first image data at a first lateral position of the biological sample and second image data at a second lateral position of the biological sample. The microscope scanner is also configured to acquire third image data at the first lateral position and fourth image data at the second lateral position, wherein the third image data is acquired at a depth that is different than that for the first image data and the fourth image data is acquired at a depth that is different than that for the second image data. The processing unit is configured to generate first working image data for the first lateral position, the generation comprising processing the first image data and the third image data by a focus stacking algorithm. The processing unit is also configured to generate second working image data for the second lateral position, the generation comprising processing the second image data and the fourth image data by the focus stacking algorithm to generate second working image data for the second lateral position. The processing unit is configured to combine the first working image data and the second working image data, during acquisition of image data, to generate the synthetic 2D image with an enhanced depth of field of the biological sample.

A discussion on focus stacking can be found on the following web page: https://en.wikipedia.org/wiki/Focus_stacking.

In this manner, a 2D image with enhanced depth of field can be acquired "on the fly". To put this another way, the 2D image with enhanced depth of field can be acquired in streaming mode. A whole series of complete image files need not be captured and stored, and post-processed after all have been acquired, but rather the enhanced image is generated as image data is acquired.

In other words, a 2D image that extends in the x and y directions can have features in focus at different x, y positions where those features are in focus over a range of depths z that is greater than the depth of focus of the microscope scanner at a particular x, y position. And, this 2D image with enhanced depth of field is generated on the fly.

In an example, the microscope-scanner is configured to acquire image data of a first section of the biological sample to acquire the first image data and the second image data, and wherein the microscope scanner is configured to acquire image data of a second section of the biological sample to acquire the third image data and the fourth image data.

In other words, the microscope-scanner can scan up (or down) through the sample, or scan laterally through the sample. In this manner, a 2D image with enhanced depth of field can be acquired "on the fly" by acquiring image data at different depths of the sample with lateral parts of the sample being imaged by the same part of a detector, or by different parts of a detector.

In an example, the microscope-scanner comprises a detector configured to acquire image data of an oblique section of the biological sample. In an example, the biological sample is a part of a pathology slide.

In this manner, by acquiring image data of an oblique section, a horizontal or lateral scan also acquires data in the vertical (depth) direction. The lateral scan can be provided when the second section is displaced horizontally or laterally from the first section in a direction perpendicular to an optical axis of the microscope scanner. For example an objective lens is moved in a lateral direction to laterally displace the section and/or the sample is moved in a lateral direction relative to the imaging and acquisition part of the microscope scanner to laterally displace the section. In other words, the microscope scans across the sample, with a sensor that is acquiring data at different depths and at different lateral positions at the same time. Due to the sensor acquiring an oblique section, the sensor can now acquire data at the same lateral position as for the previous acquisition but now at a different depth. In this manner, the image data at the same lateral position but at different depths can be compared to determine which image data contains the feature being in the best focus (the feature is at some depth in the sample). In other words, in the case where a nucleus is a feature, then different parts of the nucleus can be in focus at different depths. Then the image data with best focus at that lateral position can be used to populate a developing image with enhanced depth of field. In an example, as the sensor is scanned laterally different regions of the sensor can be activated such that a region of the sensor acquires the first image data and a different region of the sensor acquires the third image data.

In an example, the detector is a 2D detector comprising at least two active regions. In an example each active region is configured as a time delay integration (TDI) sensor.

By providing a TDI detector, the signal to noise ratio can be increased.

In an example, the microscope scanner is configured to acquire the first image data at the first lateral position of the biological sample and at a first depth and to simultaneously acquire the second image at the second lateral position of the biological sample and at a second depth, wherein the first depth is different to the second depth; and wherein the microscope scanner is configured to acquire the third image data at the first lateral position and at a third depth and to simultaneously acquire the fourth image data at the second lateral position and at a fourth depth, wherein the third depth is different to the fourth depth.

In other words the microscope scanner is simultaneously acquiring data at different lateral positions and at different depths, then data at the same lateral position but at different depths can be compared to determine the best image data of a feature at that lateral position (i.e. that which is best in focus) that is to be used as a working image for the generation of the 2D image with enhanced depth of field. In this manner, in a single scan of the detector relative to the sample in a lateral direction image data is also acquired in the depth direction, and this can be used efficiently to determine an 2D image with enhanced depth of field without having to save all the image data and post process. In other words, on the fly generation of the 2D image with enhanced depth of field can progress efficiently.

In an example, the microscope scanner has a depth of focus at the first lateral position and at the second lateral position neither of which is greater than a distance in depth between the depth at which the first image data is acquired and the depth at which the second image data is acquired.

In this manner, image data at different depths can be efficiently acquired optimally spanning a depth of the sample that is greater than the intrinsic depth of focus of the microscope, but where image data at particular lateral positions can be processed in order to provide image data at those lateral positions that is in focus, but which is at a range of depths greater than depth of focus of the camera. In this manner, different features at different depths can all be in focus across the 2D image having enhanced depth of field, and this enhanced image can be acquired on the fly without having to save all the image data acquired to determine the best image data.

In an example, the sample is at a first position relative to an optical axis of the microscope for acquisition of the first image data and second image data and the sample is at a second position relative to the optical axis for acquisition of the third image data and fourth image data.

In an example, the image data comprises a plurality of colours, and wherein the processing unit is configured to process image data by the focus stacking algorithm on the basis of image data that comprises one or more of the plurality of colours.

In an example, the plurality of colours can be Red, Green, and Blue. In an example, the processing unit is configured to process image data that corresponds to a specific colour—for example a colour associated with a dye used to stain a feature or features in the sample. In this manner, a specific feature can be acquired with enhanced depth of field. In another example, different colour channels can be merged, for example using a RGB2Y operation. In this manner, signal to noise can be increased. Also, by applying a colour separation step different, and most optimised, 2D smoothing kernels can be utilised.

In a second aspect, there is provided a method for generating a synthetic 2D image with an enhanced depth of field of a biological sample comprising:

a) acquiring with a microscope-scanner first image data at a first lateral position of the biological sample and acquiring with the microscope-scanner second image data at a second lateral position of the biological sample;

b) acquiring with the microscope-scanner third image data at the first lateral position and acquiring with the microscope-scanner fourth image data at the second lateral position, wherein the third image data is acquired at a depth that is different than that for the first image data and the fourth image data is acquired at a depth that is different than that for the second image data;

e) generating first working image data for the first lateral position, the generation comprising processing the first image data and the third image data by a focus stacking algorithm; and f) generating second working image data for the second lateral position, the generation comprising processing the second image data and the fourth image data by the focus stacking algorithm; and l) combining the first working image data and the second working image data, during acquisition of image data, to generate the synthetic 2D image with an enhanced depth of field of the biological sample.

In an example, step a) comprises acquiring the first image data at the first lateral position of the biological sample and at a first depth and simultaneously acquiring the second image at the second lateral position of the biological sample and at a second depth, wherein the first depth is different to the second depth; and wherein step b) comprises acquiring the third image data at the first lateral position and at a third depth and simultaneously acquiring the fourth image data at the second lateral position and at a fourth depth, wherein the third depth is different to the fourth depth.

In an example, the method comprises:

c) calculating a first energy data for the first image data and calculating a third energy data for the third image data; and d) calculating a second energy data for the second image data and calculating a fourth energy data for the fourth image data; and wherein, step e) comprises selecting either the first image data or the third image data as the first working image, the selecting comprising a function of the first energy data and third energy data; and wherein step f) comprises selecting either the second image data or the fourth image data as the second working image, the selecting comprising a function of the second energy data and fourth energy data; and wherein frequency information in image data is representative of energy data.

In this manner, the enhanced image can be efficiently generated such that at a particular lateral position it has a feature that is in best focus at that position. In other words, across the image irrespective of depth features that are in best focus are selected, as a function of energy data for image data, and this can be done on the fly in a streaming mode.

In an example, the methods comprises:

g) generating a first working energy data as the first energy data if the first image data is selected as the first working image or generating the first working energy data as the third energy data if the third image data is selected as the first working image; and h) generating a second working energy data as the second energy data if the second image data is selected as the second working image or generating the second working energy data as the fourth energy data if the fourth image data is selected as the second working image is the fourth image data.

In this manner, only the already generated 2D image with enhanced depth of field need be saved (the working image) that lies behind the region already swept (or scanned) by the detector and also a working energy data file associated with the pixels of the 2D enhanced image that can be updated needs to be saved. Therefore, the storage of data is minimised, and the 2D image with enhanced depth of field can be further updated based on a comparison of the energy data now acquired with the stored energy data to update the enhanced image.

In an example, the method further comprises:

i) acquiring fifth image data at the first lateral position and acquiring sixth image data at the second lateral position, wherein the fifth image data is acquired at a depth that is different than that for the first and third image data and the sixth image data is acquired at a depth that is different than that for the second and fourth image data; and j) generating new first working image data for the first lateral position, the generation comprising processing the fifth image data and the first working image data by the focus stacking algorithm, wherein the new first working image data becomes the first working image data; and k) generating new second working image data for the second lateral position, the generation comprising processing the sixth image data and the second working image data by the focus stacking algorithm, wherein the new second working image data becomes the second working image data.

In other words, the working image data for a lateral position can be updated on the basis of new image data that is acquired at that lateral position, to provide the best image at that lateral position without having to save all the previous image data, and this can be achieved as the data is acquired. Once, the detector has completely swept past a particular lateral position, then the image data will be formed from the best image data acquired at that lateral position and this will have been determined on the fly without each individual image data having to be saved, only the working image data needing to be saved for that lateral position.

According to another aspect, there is provided a computer program element controlling apparatus as previously described which, in the computer program element is executed by processing unit, is adapted to perform the method steps as previously described.

According to another aspect, there is provided a computer readable medium having stored computer element as previously described.

Advantageously, the benefits provided by any of the above aspects and examples equally apply to all of the other aspects and examples and vice versa.

The above aspects and examples will become apparent from and be elucidated with reference to the embodiments described hereinafter.

BRIEF DESCRIPTION OF THE DRAWINGS

Exemplary embodiments will be described in the following with reference to the following drawings.

DETAILED DESCRIPTION OF EMBODIMENTS

Figure 1:
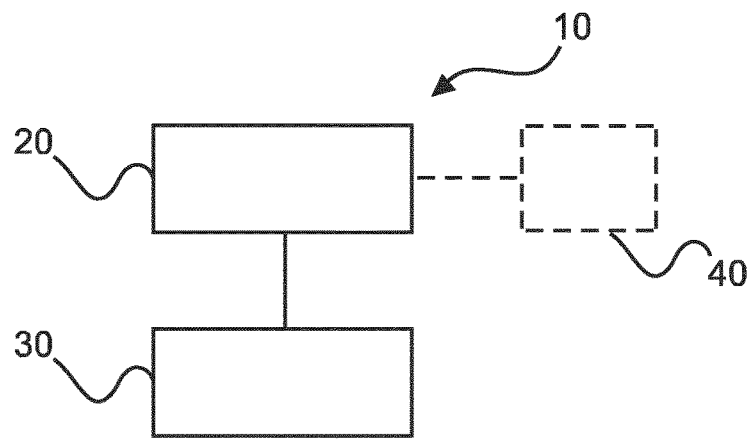
FIG. 1 shows a schematic set up of example of a system for generating a synthetic 2D image with an enhanced depth of field of a biological sample.

FIG. 1 shows a system 10 for generating a synthetic 2D image with an enhanced depth of field of a biological sample. The system 10 comprises: a microscope-scanner 20 and a processing unit 30. The microscope scanner 20 is configured to acquire first image data at a first lateral position of the biological sample and second image data at a second lateral position of the biological sample. The microscope scanner 20 is also configured to acquire third image data at the first lateral position and fourth image data at the second lateral position. The third image data is acquired at a depth that is different than that for the first image data and the fourth image data is acquired at a depth that is different than that for the second image data. The processing unit 30 is configured to generate first working image data for the first lateral position, the generation comprising processing the first image data and the third image data by a focus stacking algorithm. The processing unit 30 is also configured to generate second working image data for the second lateral position, the generation comprising processing the second image data and the fourth image data by the focus stacking algorithm to generate second working image data for the second lateral position. The processing unit 30 is configured to combine the first working image data and the second working image data, during acquisition of image data, to generate the synthetic 2D image with an enhanced depth of field of the biological sample.

In an example, the microscope scanner has a depth of focus at the first lateral position that is not greater than a distance in depth between the depth at which the first image data is acquired and the depth at which the third image data is acquired.

In an example, a movement from the first lateral position to the second lateral position is substantially parallel to a scan direction of the system.

According to an example, the microscope-scanner is configured to acquire image data of a first section of the biological sample to acquire the first image data and the second image data. The microscope scanner is also configured to acquire image data of a second section of the biological sample to acquire the third image data and the fourth image data.

In an example, the second section is displaced vertically from the first section in a direction parallel to an optical axis of the microscope scanner. In an example, an objective lens is moved in a vertical direction to vertically displace the section. In an example, the sample is moved in a vertical direction relative to the imaging and acquisition part of the microscope scanner to vertically displace the section.

In an example, the second section is displaced horizontally or laterally from the first section in a direction perpendicular to an optical axis of the microscope scanner. In an example, an objective lens is moved in a lateral direction to laterally displace the section. In an example, the sample is moved in a lateral direction relative to the imaging and acquisition part of the microscope scanner to laterally displace the section.

According to an example, the microscope-scanner comprises a detector 40 configured to acquire image data of an oblique section of the biological sample. In an example, the sample is a pathology slide. In other words, a pathology slide is being examined.

In an example, the regions of the sensor are activated using information derived from an autofocus sensor, for example as described in WO2011/161594A1. In other words, a feature can be tracked in depth by enabling appropriate regions of the sensor to be activated in order to acquire that feature at an appropriately good degree of focus to form part of an image with enhanced depth of field as that feature changes in depth within the sample.

In an example, the second section is displaced both vertically and laterally from the first section. In an example, an objective lens is moved in a vertical direction and moved in a lateral direction to displace the section. In an example, a detector is also moved in a lateral direction as the objective lens is moved laterally, to ensure that the projected image remains within the Field-of-View of the imaging system. In an example, the sample is moved in a vertical direction and moved in a lateral direction relative to the imaging and acquisition part of the microscope scanner to displace the section. In an example, an objective lens is moved in a vertical direction and the sample is moved in a lateral direction relative to the imaging and acquisition part of the microscope scanner to displace the section. In an example, an objective lens is moved in a lateral direction and the sample is moved in a vertical direction relative to the imaging and acquisition part of the microscope scanner to displace the section. In an example, a detector is also moved in a lateral direction as the objective lens is moved laterally, to ensure that the projected image remains within the Field-of-View of the imaging system In an example, before acquiring the image with enhanced depth of focus, the sample is imaged to estimate the position of a feature or features as a function of depth at different lateral (x, y) positions across the sample. Then, when the sample is scanned to generate the image with enhanced depth of focus the objective lens can be moved vertically at different lateral positions and/or sample can be moved in a vertical direction such that the same regions of the sensor can be activated to follow a feature as it changes depth within a sample in order to acquire that feature at an appropriately good degree of focus to form part of an image with enhanced depth of field as that feature changes in depth within the sample.

In an example the detector is tilted to provide the oblique section. In an example, the detector is tilted with respect to an optical axis of the microscope scanner. In other words, in a normal "non-tilted" microscope configuration, radiation from the object that is imaged onto a detector such that the radiation interacts with the detector in a direction substantially normal to the detector surface. However, with the detector tilted to provide an oblique section, the radiation interacts with the detector in a direction that is not normal to the detector surface.

In an example, the oblique section is obtained optically, for example through the use of a prism.

In an example, the first image data and the third image data are acquired by different parts of the detector, and wherein the second image data and the fourth image data are acquired by different parts of the detector.

According to an example, the detector 40 is a 2D detector comprising at least two active regions. In an example each active region is configured as a time delay integration (TDI) sensor.

In an example, the detector has at least four active regions. In other words, as the projection of the detector at the sample is moved laterally it could be moved vertically too in which case two active regions could acquire the first, second, third and fourth image data. However, as the projection of the detector is moved laterally it could remain at the same vertical position in which case four active regions could acquire the first, second, third and fourth image data.

In an example, the detector is configured to provide at least two line images, and wherein the first image data is formed from a subset of a first one of the line images and the second image data is formed from a subset of a second one of the line images.

In an example, an active region is configured to acquire a line of image data at substantially the same depth within the sample.

In other words, the 2D detector acquires a cross section of the biological sample, acquiring imagery over a range of x, y coordinates. At a number of x coordinates the detector has a number of line sensors that extend in the y direction. If the detector is acquiring an oblique cross section, then each of these line sensors also acquires data at different z coordinates (depths), where each line image can acquire image data at the same depth for example if the section is only tilted about one axis. If imagery along the length of the line sensor was utilised, a smeared image would result, therefore a section of the line image is utilised. However, in an example the image data along the line sensor is summed, which is subsequently filtered with a band filter—for details see U.S. Pat. No. 4,141,032A.

In an example, all sections along the line section are utilised. In this manner, at every x, y position the image data that is in best focus at a particular z position (depth) can be selected to populate the streamed 2D enhanced image with enhanced depth of focus that is being generated.

In an example, the detector comprises three or more active regions, each configured to acquire image data at a different depth in a sample, wherein the depth at which one active region images a part of the sample is different to the depth at which an adjacent active region images a part of the sample, where this difference is depth is at least equal to a depth of focus of the microscope. In other words, as the detector is scanned laterally each of the active areas sweeps out a "layer" within which features will be in focus as this layer has a depth equal to the depth of focus of the microscope and the active region acquires data of this layer. For example, 8 layers could be swept out across the sample, the 8 layers then extending in depth by a distance at least equal to 8 times the depth of focus of the detector. In other words, as the detector begins to scan laterally, for the simple case where the detector does not also scan vertically (i.e. the lens or sample does not move in the depth direction), then at a particular x position initially two images acquired by active areas 1 and 2 (with the section of the detector having moved laterally between image acquisitions) at different but adjacent depths are compared, with the best image from 1 or 2 forming the working image. The section of the detector moves laterally, and now the image acquired by active area 3 at position x and at an adjacent but different depth to that for image 2 is compared to the working image and the working image either remains as it is, or becomes image 3 if image 3 is in better focus that the working image (thus the working image can now be any one of images 1, 2, or 3). The section of the detector again moves laterally, and the image acquired by active area 4 at position x, but again at a different adjacent depth is compared to the working image. Thus after the image acquired by the eighth active region is compared to the working image, and the working image either becomes the eighth image data or stays as the working image, then at position x, whichever of images 1-8 that was in best focus forms the working image, which is now in focus. In the above, the active areas could be separated by more than the depth of focus of the microscope or there could be many more than 8 active regions. In this manner, a feature can be imaged in one scan of the detector where the depth of that feature in the sample varies by more than the depth of focus of the sample, and where a 2D image with enhanced depth of focus is provided without having to save each of the "layer" images, rather only saving a working image and comparing this to image data now being acquired, such that the enhanced image is acquired on the fly. In an example, the system comprises an autofocus system whereby the section (the projection of the detector at the sample) moves vertically as well as horizontally, in order for example to follow a sample that is itself varying in the z direction—for example a tissue sample could be held within microscope slides that are bowed, such that the centre part of the slides is bowed vertically towards the detector in comparison to the periphery of the slides.

In an example, the microscope scanner is configured such that the oblique section is formed such that the section is tilted in the lateral direction, for example in the scan direction. In other words, each line sensor of the detector when it forms one section is at a different x position and at a different depth z, but extends over substantially the same range of y coordinates. To put this another way, each line sensor is substantially perpendicular to the lateral direction of the scan and in this manner a greatest volume can be swept out in each scan of the detector relative to the sample.

According to an example, the microscope scanner is configured to acquire the first image data at the first lateral position of the biological sample and at a first depth and to simultaneously acquire the second image at the second lateral position of the biological sample and at a second depth, wherein the first depth is different to the second depth. The microscope scanner is also configured to acquire the third image data at the first lateral position and at a third depth and to simultaneously acquire the fourth image data at the second lateral position and at a fourth depth, wherein the third depth is different to the fourth depth.

According to an example, the microscope scanner has a depth of focus at the first lateral position and at the second lateral position neither of which is greater than a distance in depth between the depth at which the first image data is acquired and the depth at which the second image data is acquired.

According to an example, the sample is at a first position relative to an optical axis of the microscope for acquisition of the first image data and second image data and the sample is at a second position relative to the optical axis for acquisition of the third image data and fourth image data.

In an example, the sample is configured to be moved in a lateral direction with respect to the optical axis, wherein the sample is at a first position for acquisition of the first and second image data and the sample is at a second position for acquisition of the third and fourth image data.

According to an example, the image data comprises a plurality of colours, and wherein the processing unit is configured to process image data by the focus stacking algorithm on the basis of image data that comprises one or more of the plurality of colours.

In an example, the plurality of colours can be Red, Green, and Blue. In an example, the processing unit is configured to process image data that corresponds to a specific colour—for example a colour associated with a dye used to stain a feature or features in the sample. In this manner, a specific feature can be acquired with enhanced depth of field. In another example, different colour channels can be merged, for example using a RGB2Y operation. In this manner, signal to noise can be increased. Also, by applying a colour separation step different, and most optimised, 2D smoothing kernels can be utilised.

In an example, the first working image data is either the first image data or the third image data, and wherein the second working image data is either the second image data or the fourth image data.

In other words, the best focal position of a specific feature is acquired and this is used to populate the streamed enhanced image that is being generated.

In an example, the processing unit is configured to calculate a first energy data for the first image data and calculate a third energy data for the third image data and generating the first working image comprises selecting either the first image data or the third image data as a function of the first energy data and third energy data, and wherein the processing unit is configured to calculate a second energy data for the second image data and calculate a fourth energy data for the fourth image data and generating the second working image comprises selecting either the second image data or the fourth image data as a function of the second energy data and fourth energy data. It should be again mentioned that "image data" here does not necessarily mean the all the image data acquire by the detector, for example along a line image. Rather the selection is on a pixel basis, meaning that a subset of one line scan can form the first image data for example. The reason for this is that parts of a line scan can be in focus, and these should be merged with the different relevant parts of the working image that are in focus.

In an example, a high pass filter is used to calculate the energy data. In an example, the high pass filter is a Laplacian filter. In this, at each lateral position features that are in best focus at a particular depth can be selected and used in the 2D image with enhanced depth of field.

In an example, after filtering a smoothing operation is applied. In this manner noise can be reduced.

In an example, rather than applying a Laplacian filter the acquired data are translated to the wavelet domain, where the high frequency sub band can be used as a representation of the energy. This can be combined with the iSyntax compression (see for example U.S. Pat. No. 6,711,297B1 or 6,553,141).

In an example, rather than selecting either the first image data or the third image data, the first image data and third image data are combined using a particular weighting based on the distribution of energy of the first image data and the third image data.

In an example, the processing unit is configured to generate a first working energy data as the first energy data if the first image data is selected as the first working image or generate the first working energy data as the third energy data if the third image data is selected as the first working image, and wherein the processing unit is configured to generate a second working energy data as the second energy data if the second image data is selected as the second working image or generate the second working energy data as the fourth energy data if the fourth image data is selected as the second working image is the fourth image data.

In an example, the microscope scanner is configured to acquire fifth image data at the first lateral position and sixth image data at the second lateral position, wherein the fifth image data is acquired at a depth that is different than that for the first and third image data and the sixth image data is acquired at a depth that is different than that for the second and fourth image data; and wherein the processing unit is configured to generate new first working image data for the first lateral position, the generation comprising processing the fifth image data and the first working image data by the focus stacking algorithm, wherein the new first working image data becomes the first working image data; and the processing unit is configured to generate new second working image data for the second lateral position, the generation comprising processing the sixth image data and the second working image data by the focus stacking algorithm, wherein the new second working image data becomes the second working image data.

In an example, the processing unit is configured to calculate a fifth energy data for the fifth image data and calculate a sixth energy data for the sixth image data; and wherein the processing unit is configured to generate new first working energy data as the fifth energy data if the first working image is selected as the fifth working image or generate new first working energy data as the existing first working energy data if the first working image is selected as the existing first working image; and wherein the processing unit is configured to generate new second working energy data as the sixth energy data if the second working image is selected as the sixth working image or generate new second working energy data as the existing second working energy data if the second working image is selected as the existing second working image.

In an example, a measure of the sum of the energy at a particular lateral position (i.e., at an x coordinate) is determined. In this manner, a thickness of the tissue can be determined as this is related to the energy in each image (e.g, related to the energy in each layer).

Figure 2:
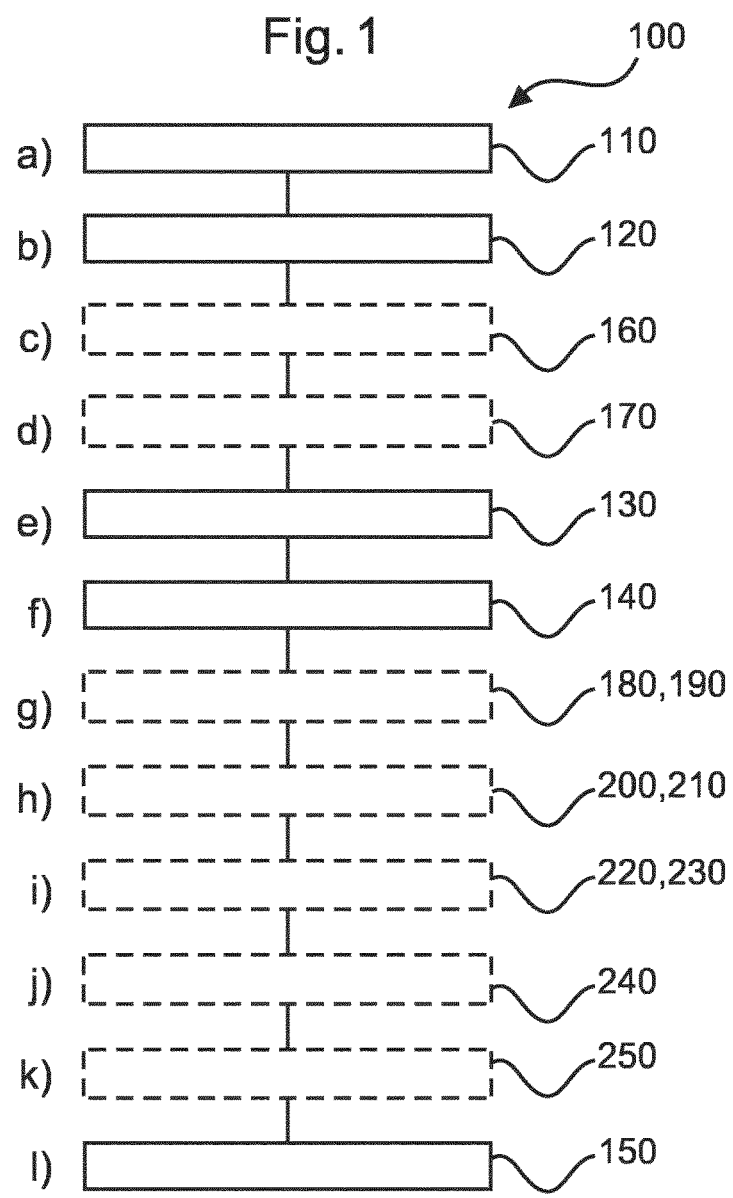
FIG. 2 shows a method for generating a synthetic 2D image with an enhanced depth of field of a biological sample.

FIG. 2 shows a method 100 for generating a synthetic 2D image with an enhanced depth of field of a biological sample in its basic steps. The method comprises the following:

In an acquiring step 110, also referred to as step a), a microscope-scanner 20 is used to acquire first image data at a first lateral position of the biological sample and is used to acquire second image data at a second lateral position of the biological sample.

In an acquiring step 120, also referred to as step b), the microscope-scanner is used to acquire third image data at the first lateral position and is used to acquire fourth image data at the second lateral position, wherein the third image data is acquired at a depth that is different than that for the first image data and the fourth image data is acquired at a depth that is different than that for the second image data.

In a generating step 130, also referred to as step e), first working image data is generated for the first lateral position, the generation comprising processing the first image data and the third image data by a focus stacking algorithm.

In a generating step 140, also referred to as step f), second working image data is generated for the second lateral position, the generation comprising processing the second image data and the fourth image data by the focus stacking algorithm.

In a combining step 150, also referred to as step 1), the first working image data and the second working image data are combined, during acquisition of image data, to generate the synthetic 2D image with an enhanced depth of field of the biological sample.

In an example, the microscope-scanner is configured to acquire image data of a first section of the biological sample to acquire the first image data and the second image data, and wherein the microscope scanner is configured to acquire image data of a second section of the biological sample to acquire the third image data and the fourth image data.

In an example, the microscope-scanner comprises a detector configured to acquire image data of an oblique section of the biological sample.

In an example, the detector is a 2D detector comprising at least two active regions. In an example each active region is configured as a time delay integration (TDI) sensor.

According to an example, step a) comprises acquiring the first image data at the first lateral position of the biological sample and at a first depth and simultaneously acquiring the second image at the second lateral position of the biological sample and at a second depth, wherein the first depth is different to the second depth; and wherein step b) comprises acquiring the third image data at the first lateral position and at a third depth and simultaneously acquiring the fourth image data at the second lateral position and at a fourth depth, wherein the third depth is different to the fourth depth.

In an example, the sample is at a first position relative to an optical axis of the microscope for acquisition of the first image data and second image data and the sample is at a second position relative to the optical axis for acquisition of the third image data and fourth image data.

In an example, the sample is configured to be moved in a lateral direction with respect to the optical axis, wherein the sample is at a first position for acquisition of the first and second image data and the sample is at a second position for acquisition of the third and fourth image data.

In an example, the image data comprises a plurality of colours, and wherein the processing unit is configured to process image data by the focus stacking algorithm on the basis of image data that comprises one or more of the plurality of colours.

In an example, the first working image data is either the first image data or the third image data, and wherein the second working image data is either the second image data or the fourth image data.

According to an example, the method comprises:

In a calculating step 160, also referred to as step c), a first energy data for the first image data is calculated and a third energy data for the third image data is calculated.

In a calculating step 170, also referred to as step d), a second energy data is calculated for the second image data and a fourth energy data is calculated for the fourth image data; and wherein, step e) comprises selecting either the first image data or the third image data as the first working image, the selecting comprising a function of the first energy data and third energy data; and wherein step f) comprises selecting either the second image data or the fourth image data as the second working image, the selecting comprising a function of the second energy data and fourth energy data. To recall, this selection can be at a local (pixel or few pixel) level rather than for the complete line of pixels, in other words at a level relating to parts of the line of pixels.

According to an example, the methods comprises:

In a generating step, also referred to as step g), a first working energy data is generated 180 as the first energy data if the first image data is selected as the first working image or the first working energy data is generated 190 as the third energy data if the third image data is selected as the first working image; and In a generating step, also referred to as step h), a second working energy data is generated 200 as the second energy data if the second image data is selected as the second working image or the second working energy data is generated 210 as the fourth energy data if the fourth image data is selected as the second working image is the fourth image data.

To recall, the detector can be acquiring line image data, such that a first image is a subset of that line image data etc, with selection able to proceed at a local (pixel) level, such that images can be combined to create a new working image having features in focus coming each of the input images.

According to an example, the method further comprises:

In an acquiring, also referred to as step i), fifth image data is acquired 220 at the first lateral position and sixth image data is acquired 230 at the second lateral position, wherein the fifth image data is acquired at a depth that is different than that for the first and third image data and the sixth image data is acquired at a depth that is different than that for the second and fourth image data.

In a generating step 240, also referred to as step j), new first working image data is generated for the first lateral position, the generation comprising processing the fifth image data and the first working image data by the focus stacking algorithm, wherein the new first working image data becomes the first working image data.

In a generating step 250, also referred to as step k), new second working image data is generated for the second lateral position, the generation comprising processing the sixth image data and the second working image data by the focus stacking algorithm, wherein the new second working image data becomes the second working image data.

The system and method for generating a synthetic 2D image with enhanced depth of field of a biological sample will now be described in more detail with reference to FIGS. 3-18.

Figure 3:
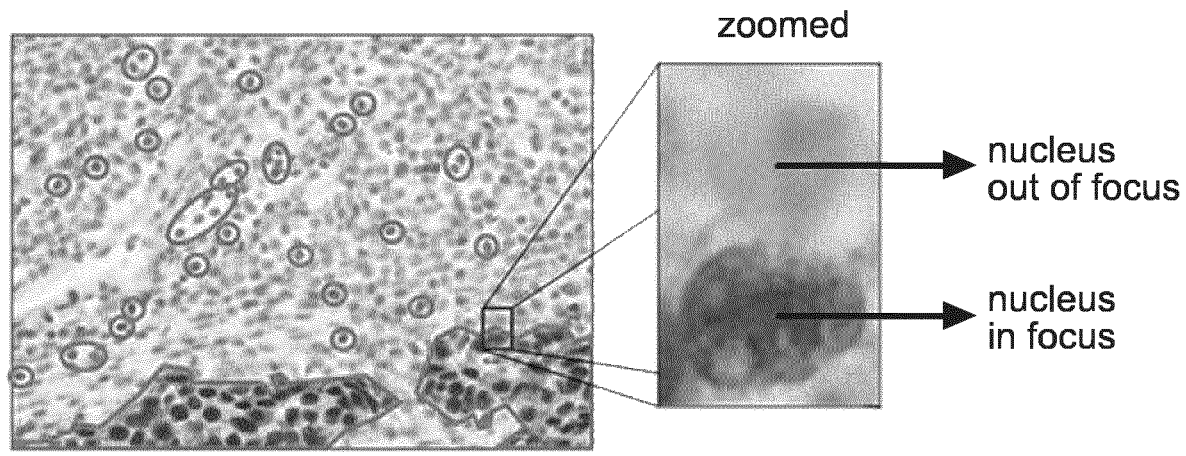
FIG. 3 shows an example image of focus variation in a tissue sample.
Figure 4:
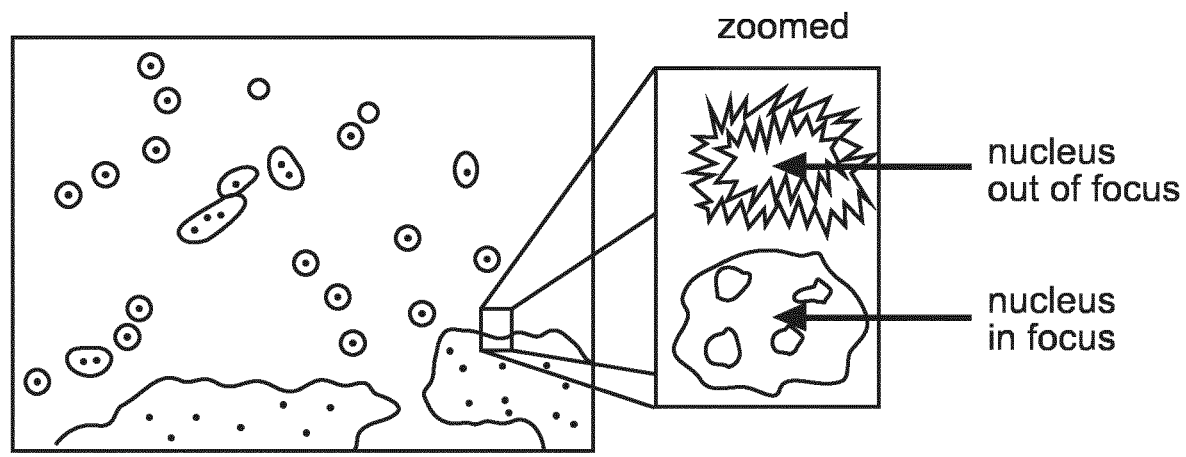
FIG. 4 shows schematically the content of the image shown in FIG. 3.

FIGS. 3 and 4 helps to show an issue addressed by the system and method for generating a synthetic 2D image with enhanced depth of field of a biological sample. In pathology, images of tissue samples or smears are analysed using a microscope. In histopathology and/or cytopathology, the pathologist studies tissue in order to come to a diagnosis. A tissue sample is a thin slice of tissue mounted between two glass slides. This tissue is not perfectly flat and typically not perfectly aligned with the focal plane of the imaging system. Besides, the cells of the tissue are positioned at different heights in the tissue layer. Consequently, a significant part of the cells in a 2D tissue image will be out of focus. This is illustrated in FIGS. 3 and 4, which shows focus variations in a tissue sample observed at 20× magnification. In the left hand image of both of these figures, the solid lines indicate several nuclei that are in proper focus. In the right hand image of both of these figures, a zoomed in section of the left hand image shows a nucleus in focus and a nucleus that is out of focus. The microscope used to acquire this image is focussed at the depth where the nucleus that is in focus is located. The microscope has a depth of focus, such that to a greater or lesser degree features within that depth of focus are in focus. However, the nucleus in the top part of the right hand zoomed image is located at a depth that is outside of this depth of focus, and as a result is out of focus.

In practise, the pathologist uses the fine focus knob of the microscope to navigate to the right plane in z-direction. Currently, pathologists transfer more and more to the digital workflow. Then, image data is acquired with a digital scanner and stored on a server and the pathologists analyses the images on a screen. As the optics of the digital scanner also has a limited depth of field, a 3D scan of the tissue sample is required. However, this leads to a large amount of data requiring to be stored.

Figure 5:
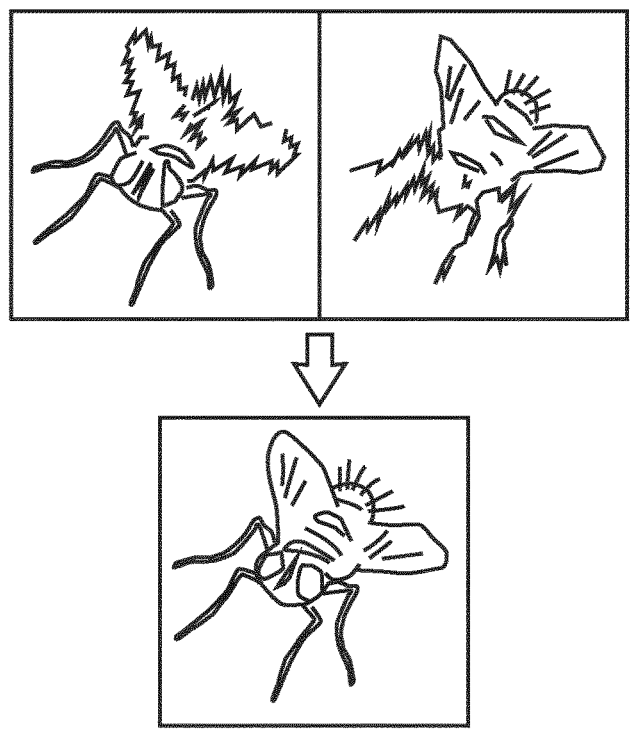
FIG. 5 shows schematically an example of focus stacking, with more than one image being combined into a single image.

FIG. 5 schematically shows an example of a focus stacking technique. A microscope is being used to acquire images of a fly, which has a depth greater than the depth of focus of the microscope. A number of digital images are acquired at different focal positions, such that different parts of the fly are in focus in different images. In one image a front part of the fly is in focus, whilst a rear part of the fly is out of focus. In another image, the front part of the fly is out of focus, whilst the rear part of the fly is in focus. In other words, a 3D stack of images is acquired with each image being a 2D image at a particular focal depth. After the images are acquired, they can be compared to determine which parts of the fly are in focus in which image. Then a composite image is generated from the in-focus parts of the fly from the differing images. However, all the images at the different focal depths have to be stored, which requires a very large image buffer, and an enhanced image is only determined after all the images have been acquired, and each image only relates to one depth.

The system and method for generating a synthetic 2D image with enhanced depth of field of a biological sample, addresses the above issues by providing a streaming focus stacking technique that can be applied to convert image data into an artificial (synthetic) 2D image with enhanced depth of field as the data is being acquired. This is done "on the fly" without intermediate image files having to be saved, obviating the need for very large image buffers. In an example, image data is acquired from multiple z-positions (depths) simultaneously. The system and method for generating a synthetic 2D image with enhanced depth of field of a biological sample is specifically discussed with reference to FIGS. 6-18.

Figure 6:
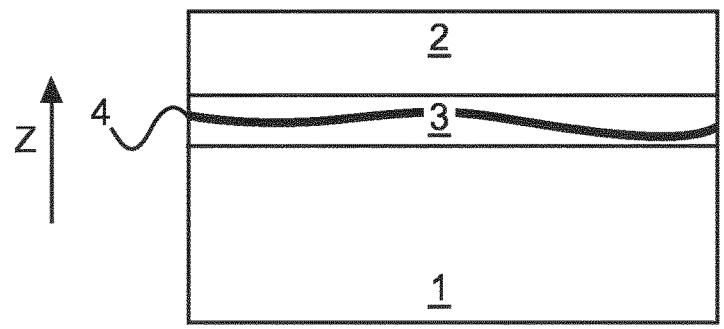
FIG. 6 shows schematically two diagrams of a cross section of a tissue slide assembly.
Figure 6:
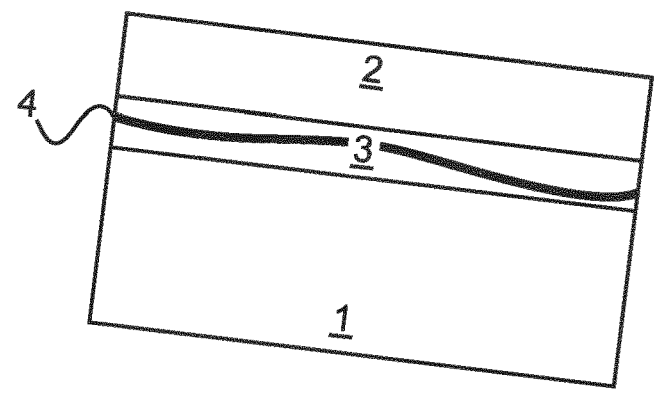

FIG. 6 shows schematically two diagrams of a cross section of a tissue slide assembly. The tissue slide assembly comprises a microscope slide 1, having a typical thickness of 1 mm, a coverslip 2, the typical thickness of 0.17 mm, a mounting medium 3 for fixing and sealing off a tissue layer 4. The tissue layer 4 can be the order of 10-20 μm thick, with the mounting medium 3 forming a layer that can be 15-30 μm thick. The mounting medium can be applied to the slide with tissue layer in liquid form before the coverslip is attached to the slide, subsequently the mounting liquid solidifies and thus mechanically fixes the tissue layer and seals off the outside environment in order to provide stability against deterioration. The position in depth of the tissue layer may vary within the mounting medium layer, and the tissue slide assembly can itself not be perfectly flat or be misaligned through being tilted for example (as shown in the lower image of FIG. 6). Furthermore, pathological features (for example histo-pathological and/or cyto-pathological) that are required to be imaged can themselves be at different depths within the 10-20 μm thick tissue layer.

Figure 7:
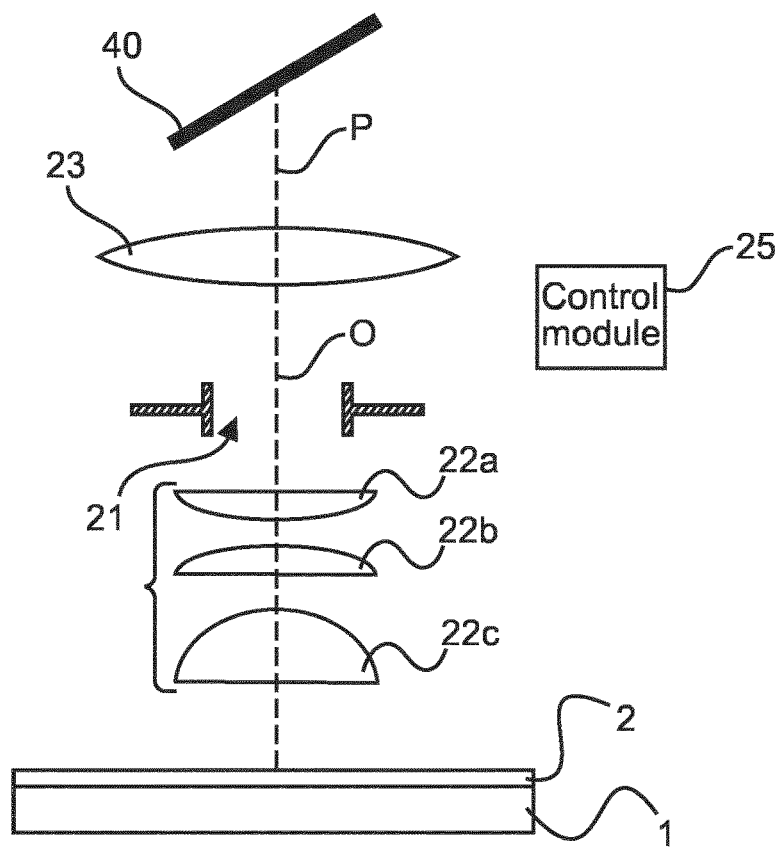
FIG. 7 shows schematically an example of a microscope scanner.

FIG. 7 shows schematically an example of a microscope scanner that is used to generate a synthetic 2-D image with enhanced depth of field of such a biological sample as shown in FIG. 6. This microscope scanner is arranged for imaging the tissue layer (e.g. biological sample) as shown in FIG. 6. Tissue slide assembly is placed in a holding surface of a sample order, which is not shown in the figure. Along an imaging path P and starting from the tissue slide assembly, the microscope scanner comprises a microscope objective 22, typically made of a plurality of lenses 22 *a, b* and *c*, an aperture 21 for blocking radiation. The microscope scanner also comprises a tube lens 23 and a sensor in the form of a 2-D detector array 40. The detector is tilted with respect to the optical axis O of the microscope objective lens and this forms an oblique projection (section) of the detector in the object (sample). Such an oblique section could also be formed optically, through for example the use of a prism rather than having the detector tilted to the optical axis. In another example, the detector being configured to acquire image data of an oblique section of the biological sample is achieved for the case where the optical axis O of the microscope objective is parallel to a normal to the detector surface. Rather, the sample stage itself is tilted with respect to the optical axis O and the sample is scanning parallel to the tilted angle of the sample. The microscope scanner comprises a control module 25, which can be part of a processor 30, controlling the operating process of the scanner and the scanning process for imaging the sample. Light passing through the slide 1, the coverslip 2 the mounting medium 3 and the tissue layer 4 is captured by the objective lens 22, and imaged by the tube lens 23 on to the 2-D detector array 40. It is to be noted that "tilted" with respect to the optical axis means that the radiation from the sample which impinges on the detector does not impinge perpendicularly (as discussed this can be achieved through tilting of the sensor itself, or optically for a non-tilted sensor).

Figure 8:
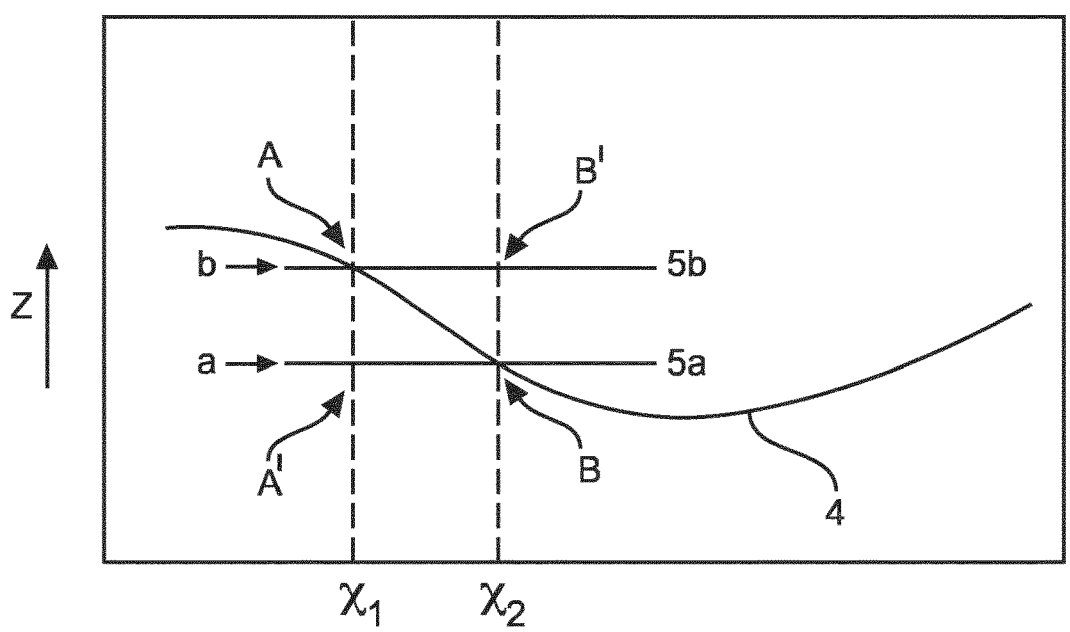
FIG. 8 shows schematically a cross section of a sample, with a projection of a 2D detector array shown at two vertical positions.

FIG. 8 serves to help explain one example of the system and method for generating a synthetic image with an enhanced depth of field of a biological sample. FIG. 8 schematically shows a feature, such as a part of the tissue layer 4, that extends laterally across a tissue slide assembly. The tissue layer varies in depth across the tissue slide assembly over a distance that is greater than the depth of focus of the microscope scanner at positions across the projection (section 5—shown as two sections 5*a* and 5*b* acquired at different times) of the detector in the object (sample). At a lateral position x1 the tissue layer 4 has feature A that is to be imaged, such as a particular part of tissue that has been stained with a dye such that is characterised by transmitting green light. At a lateral position x2 the tissue layer 4 has feature B that is to be imaged, such as a particular part of tissue that has been stained with a dye such that is characterised by transmitting green light. In other words, the feature A and feature B could be the same type of material. However, feature B could be different type of material to that at position x1, where there is no material at position x2 that is the same as that at position x2, rather feature B for example has been stained with a dye such that it is characterised by transmitting red light. However, when viewing the overall tissue sample a pathologist wishes to be able to see both feature A and feature B in focus across the tissue slide assembly at the same time. An example of the present system and method can be explained as followed. The microscope scanner is configured such that image data is acquired of a section 5*a* of the sample. In other words, the projection of the detector of the microscope scanner is located at position (a) shown in FIG. 8. The microscope scanner has a depth of focus such that features within a small distance either side of the section 5*a* are in focus. Therefore, in a first image acquired of the section 5*a*, the tissue layer 4 is out of focus at position x1, with the out of focus feature termed A'. However, in the first image acquired of the section 5*a*, the tissue layer 4 is in focus at position x2, with the in focus feature termed B. The acquired image becomes a working image. The microscope objective is then moved, such that the section 5 over which data are required has moved vertically to position 5*b* in the sample. Rather than move the objective lens, the sample itself could be moved downwards (parallel to the optical axis O as shown in FIG. 7. In this second image, at position x1 feature A is now in focus, whilst feature B is out of focus B'. A processing unit, not shown, then updates the working image such that the image data at position x1 is changed from that acquired in the first image to that acquired in the second image (A' becomes A), whilst the image data at position x2 is not changed. This can be carried out at a number of positions along the detector, and for a number of vertical positions through the sample. The working image is then at all lateral positions (x) continuously updated with the most in focus feature at that lateral position on the fly. Only the working image needs to be saved and compared with the image has just been acquired, and all the previously acquired images need not be saved. In this manner, the working image contains features that are in focus but that are also at depths greater than the depth of focus of the microscope. Having progressed vertically through the sample the whole sample itself can be translated laterally and the operation repeated for a part of the sample has not yet been imaged. Accordingly, an on-the-fly image is created having enhanced depth of focus while the sample is scanned, which enables saving a large amount of data. In the example shown in FIG. 8, the projection of the detector at the sample (section 5) is shown perpendicularly to the optical axis O, however it is apparent that this described streaming technique for generating an image with an enhanced depth of field can operate if the projection of the detector of the sample is such that section 5 is oblique, i.e., not perpendicular to the optical axis O.

Figure 9:
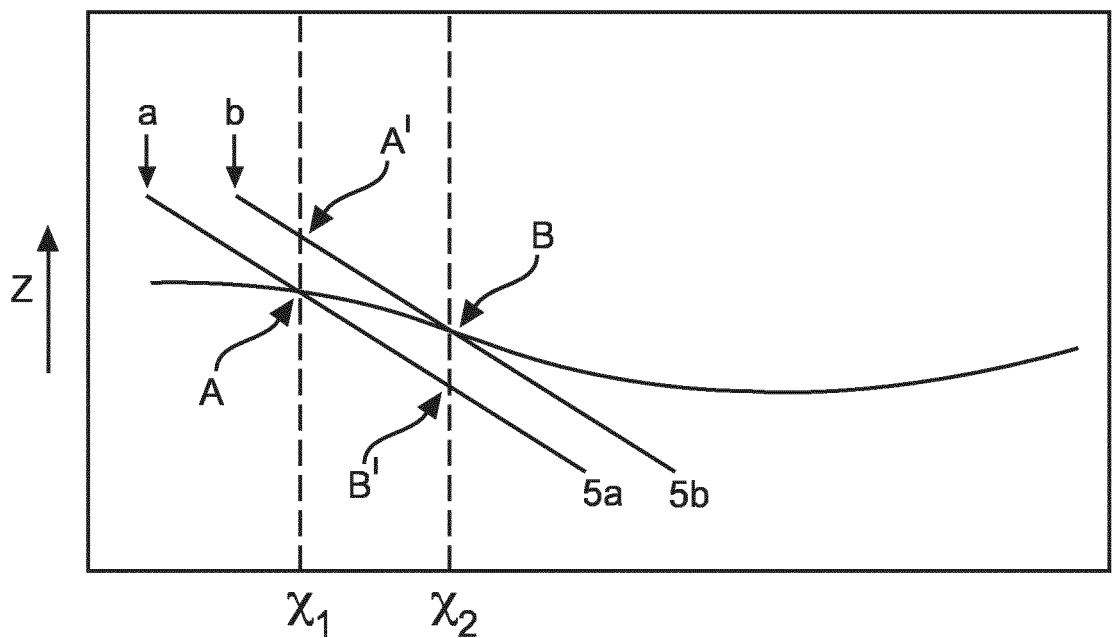
FIG. 9 shows schematically a cross section of a sample, with a projection of a 2D detector array shown at two horizontal (lateral) positions.

FIG. 9 serves to help explain another example of the system and method for generating a synthetic image with an enhanced depth of field of a biological sample. FIG. 9 schematically shows the feature, such as a part of the tissue layer 4, as was shown in FIG. 8. Again, the tissue layer varies in depth across the tissue slide assembly over a distance that is greater than the depth of focus of the microscope scanner at positions across the projection (section 5—shown as two sections 5a and 5b acquired at different times) of the detector in the object (sample). At a lateral position x1 the tissue layer 4 has feature A that is to be imaged, such as a particular part of tissue that has been stained with a dye such that is characterised by transmitting green light. Now, the microscope scanner comprises a detector configured to acquire image data of oblique sections (5a, 5b) of the biological sample. As discussed above, this can be achieved through tilting of the detector or optically. In a first image acquired (a) of the section 5a the tissue layer 4 is in focus at position x1, with this termed feature A. However, in the first image of section 5a the tissue layer 4 is out of focus at position x2, with this termed feature B'. As for the example described with respect to FIG. 8, the acquired image becomes a working image. The microscope scanner is then configured to move the projection of the detector (section 5) such that oblique section 5a moves laterally and is shown as oblique section 5b. A sample stage moves laterally in order that image data of an oblique section is acquired at different lateral position within the sample. However, movement of the lenses and/or the detector could affect this movement of the oblique section as would be understood by the skilled person. At the new position, termed (b) the detector again acquires data at position x1 and at position x2, however different parts of the detector are now acquiring this data for the situation where the oblique section has only moved laterally. In the second image, at position x1 the tissue layer 4 is now out of focus, with the acquired image termed A', whilst the tissue layer 4 at position x2 is in focus, with this termed feature B. A processing unit, not shown, then updates the working image such that the image data at position x1 remains as it is whilst the image data at position x2 is changed to that acquired in the second image (B' becomes B). This can be carried out at a number of positions along the detector, each equating with a different vertical position through the sample. As the oblique section 5 is scanned laterally through the sample the working image is then at all lateral positions (x) continuously updated with the most in focus feature at that lateral position on the fly. Only the working image needs to be saved and compared with the image that has just been acquired, and all the previously acquired images need not be saved. In this manner, the working image contains features that are in focus but that are also at depths greater than the depth of focus of the microscope. Having progressed laterally through the sample the whole sample itself can be translated laterally, perpendicularly to the previous scan direction, and the operation repeated for a part of the sample that has not yet been imaged. In other words, an on-the-fly image is created having enhanced depth of focus while the sample is scanned, which enables saving a large amount of data. In FIG. 9 oblique section 5 is shown as only moving laterally in the x direction, however as well as moving the sample stage such that the oblique section moves laterally, the microscope objective can be moved vertically in the direction of the optical axis such that the oblique section moves both laterally and vertically. In this manner the microscope scanner can follow large-scale deviations in vertical positions of the layer 4.

Figure 10:
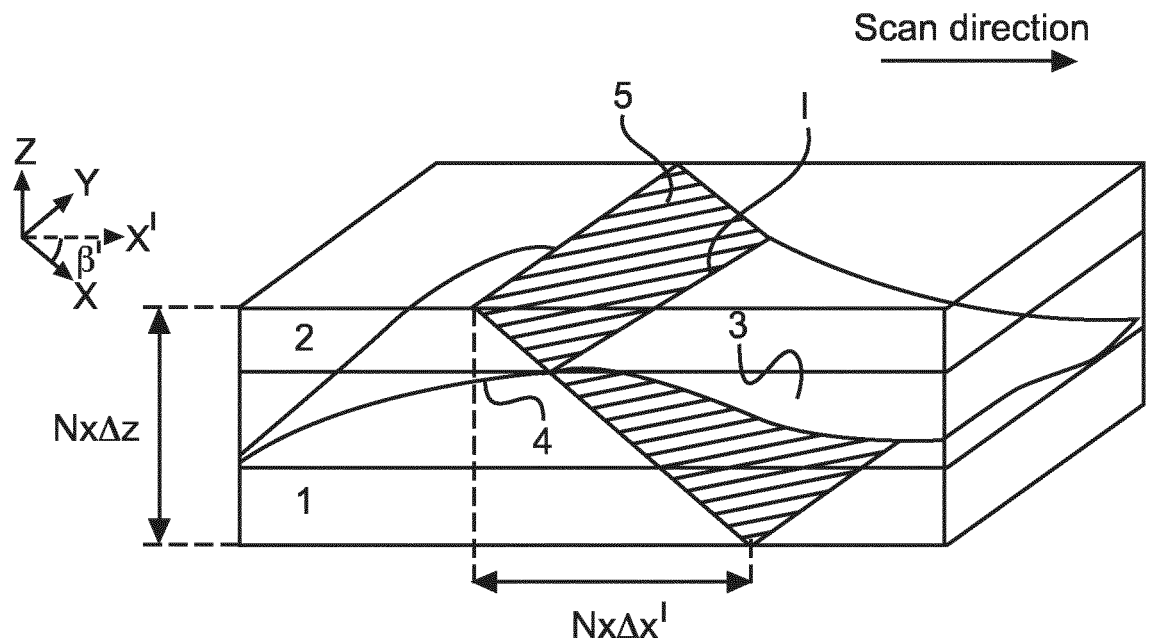
FIG. 10 shows schematically a tissue slide assembly and a projection of a 2D detector array.

FIG. 10 shows schematically a tissue slide assembly and a projection of a 2D detector array, and serves to help further explain an example of the system and method for the generation of a synthetic 2D image with enhanced depth of field. FIG. 10 again illustrates a tissue slide assembly with a glass slide 1, coverslip 2, mounting medium 3, and tissue layer 4. A projection of the 2-D array of the detector is shown as section 5, which corresponds to the region of the tissue slide assembly (and sample) where the sensor can actually detect an image. A Cartesian coordinate system X', Y, Z is shown, where the detector has been tilted with respect to the X' axis by an angle $\beta'$ of 30°. In an example, X' and Y lie in the horizontal plane and Z extends in a vertical direction. In other words the detector lies in the X-Y plane, tilted out of the horizontal plane. It is to be understood, that these axes are described with respect to the schematic system as shown in FIG. 7, where the detector is in a direct line along the optical axis O, however the skilled person will appreciate that a mirror or mirrors could be utilized such that the detector in a vertical orientation as shown in FIG. 7 would not be tilted. Axis X' is in the lateral direction, which is the scan direction and which in this example is perpendicular to the optical axis O. Due to the sample having a refractive index, section 5 makes an angle $\beta$ in the sample that is different to the angle of tilt $\beta'$ of the detector (in a similar way to a stick half in and half out of water, appearing to bend at the interface between the air and water). The oblique cross section 5 intersects with tissue layer 4 at intersection I shown in FIG. 10, with intersection I then being in focus. As will be discussed in more detail with reference to FIG. 12, the detector is operated in a line scanning mode. In other words a row or a number of adjacent rows of pixels can be activated, where each row is at a lateral position x' and extends into the page as shown in FIG. 10 along the Y axis. If tissue layer 4 was not angled in the Y direction, then intersection I would be at the same depth Z along the Y axis, and intersection I would be imaged in focus by the one or more activated rows. However, not only can intersection I vary in X' and Y coordinates along its length, but different features to be imaged can be present in the Y axis of the sample. Therefore, referring back to FIGS. 8 and 9, and how a working image is continuously generated, those diagrams can be considered to represent a slice through the tissue slide assembly as shown in FIG. 10, at one Y coordinate. The process as explained with reference to FIGS. 8 and 9 is then carried out for all the slices at different Y coordinates. In other words, image data at each X', Y position, but with different Z coordinates, acquired for different oblique sections 5 is continuously updated to have the best focused feature at that X', Y position, where that update can either mean that the image in a just acquired image replaces the corresponding image in the working image if the new image data has a better focus, or if the working image has a better focus the working image remains as it is for the image at that X', Y coordinate.

Figure 11:
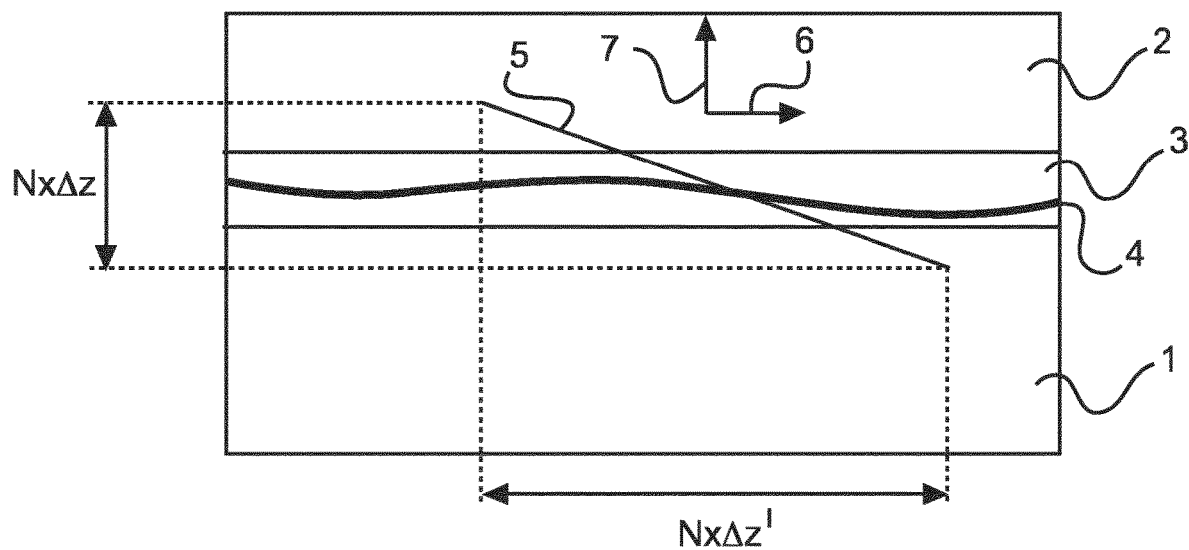
FIG. 11 shows schematically a cross section of a tissue slide assembly, with a projection of a 2D detector array shown.

FIG. 11 shows schematically a cross section of a tissue slide assembly, with a projection of a 2D detector array shown and serves to help explain the system setup. As seen from FIG. 11, the tilted detector makes an image of an oblique cross section 5 of the tissue slide assembly. The tilt is in a scanning direction 6, in the lateral direction (X'). Along the X axis the detector as Nx pixels and samples the object in the scan (lateral) direction X' with $\Delta x'$ per pixel and in the axial (vertical) direction 7 (Z) parallel to the optical axis O with $\Delta z$ per pixel. In the X direction, each pixel has a length L. As discussed above, the detector is tilted by an angle $\beta'$, therefore the lateral and axial sampling at the object is given by:

$$\Delta x' = \frac{L\cos\beta'}{M}$$

$$\Delta z = \frac{nL\sin\beta'}{M^2}$$

Where M is the magnification and n is the refractive index of the object.

Figure 12:
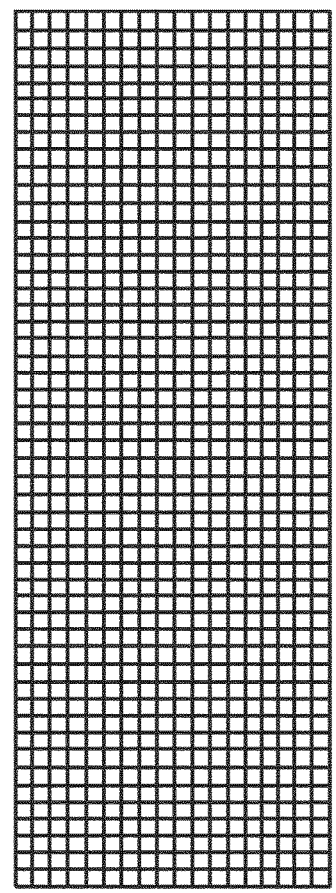
FIG. 12 shows schematically an example 2D detector array.

FIG. 12 shows schematically an example 2D detector array, that acquires data used to generate the image with an enhanced depth of focus. The pixels shown in white are sensitive to light and can be used for signal acquisition if activated, with other pixels not shown being used for dark current and signal offsets. A number of pixels, not shown, represent the pixel electronics. A number of rows (or lines) of pixels form an individual line imaging detector, which with reference to FIG. 10 is at one X', Z coordinate and extends into the page along the Y axis. A strip of pixels consisting of adjacent lines of pixels can be combined using time delay integration (TDI) into a single line of pixel values. Different numbers of lines can be combined in different example detectors, where for example, 2, 3, 4, 5, 10 or more adjacent lines of pixels can be combined using TDI. In effect, each strip of pixels can act as an individual TDI sensor, thereby improving signal-to-noise. For this detector, each line imaging detector has a length of several thousand pixels extending in the Y direction, which for example represents line I as shown in FIG. 10. For example, the length can be 1000, 2000, 3000, 4000, 5000 or other numbers of pixels. If a focus actuator is not used to move the objective lens during lateral scan, then each line detector will image the sample at a constant depth over the depth of focus of the microscope scanner, which is approximately 1 µm. As discussed, each strip of pixels can represent a number of rows of a single TDI block if the TDI is activated. The detector contains a number of these blocks, separated by readout electronics. For, example the detector can contain 100, 200, or 300 blocks. The detector can have other numbers of blocks. Relating to cross-section 5, which is the projection of the detector in the sample, the distance in the z direction between each TDI block can be calculated using the above equation. Therefore, with a depth of focus of approximately 1 µm there can be a number of TDI blocks distributed within this depth of focus. The detector can be configured such that the distance in the z direction between blocks can be varied, and the distance can vary between blocks. One of these TDI blocks, or indeed a number of these blocks within this depth of focus, can be used individually or some together to provide image data at a particular depth. Then, one or more TDI blocks at a different position of the detector, along the X axis, can be activated to acquire image data for a different depth of the sample over a depth of focus. The second depth is separated from the first depth by at least the depth of focus (approximately 1 µm). Each TDI block, or TDI blocks, over the depth of focus at a particular depth in effect sweeps out a layer of image data within the sample, the layer having a thickness approximately equal to the depth of focus of the microscope (~1 µm). Therefore, to acquire data for a sample having a thickness of 8 µm, means that eight such TDI blocks, at different positions along the detector, each at a different depth and lateral position but having the same depth along its length, can be used to acquire the image data from the sample. The features to be imaged can lie anywhere within this 8 µm depth. Therefore, as cross-section 5 is swept laterally through the sample, each of these eight TDI blocks will acquire image data at the same X', Y coordinates of the sample, but at different depths Z. It is therefore to be noted that active TDI blocks used to acquire data can be spaced from another active TDI block that is acquiring data by a number of TDI blocks that are not acquiring data. A first image comprising image data from these 8 TDI blocks is used to form a working image comprising image data for each X', Y position imaged. When the cross-section 5 is moved laterally within the sample, image data will be acquired for the majority of the X', Y positions already imaged, but at a different depths for those X', Y positions. As discussed with reference to FIGS. 8 and 9 the working image is updated such that it contains the best focus image at that X', Y position acquired thus far. This can be done on the fly, without the need to save all the image data, rather a working image file is saved and compared with the image file just acquired and updated where necessary. A synthetic 2D image is thereby generated with an enhanced depth of field, where a feature at one depth in the sample can be in focus and a different feature at a different depth in the sample can also be in focus, where those depths are greater than the depth of focus of the system such that it is not possible to have both in focus in a regular setup (which only acquires data at one depth over a depth of focus of the system). In other words, multiple pathological features can be in focus while these features change differently in depth within the sample. Rather than selecting the working image file to be either new image data or maintaining the original working image data, a weighted sum of the new image data with the existing working image data can be used to provide an updated working image. Although the detector is working in a line imaging mode, it should be noted that individual sections along the line image are used separately. This is because, a particular feature at one point along the line image can be in focus whilst another feature, due to it being at different depth outside the depth of focus, at another point along the line image can be out of focus. Therefore, selection is made on a more local (pixel) level, where pixel can mean several pixels sufficient to make a comparison with the working image data to determine which data at that lateral position (specific X', Y coordinate range) is in the best focus. Rather than being fixed relative to one another, the TDI blocks used to acquire data can move up and down the detector, and also move relative to one another. The spacing between the TDI blocks used to acquire data can remain the same as the TDI blocks move, or the spacing between the TDI blocks can vary as a TDI blocks move, with the spacing between adjacent TDI blocks varying differently for different TDI blocks. This provides the ability to scan a sample at different resolution levels, and to have different resolution levels throughout the sample. For example, across a sample, features to be images could be predominantly in the top part of the sample and also in the bottom part of the sample. Then, a number of TDI blocks could be arranged to scan the top part of the sample and a number arranged to scan the bottom part of the sample, with few TDI blocks scanning the centre part of the sample.

Figure 13:
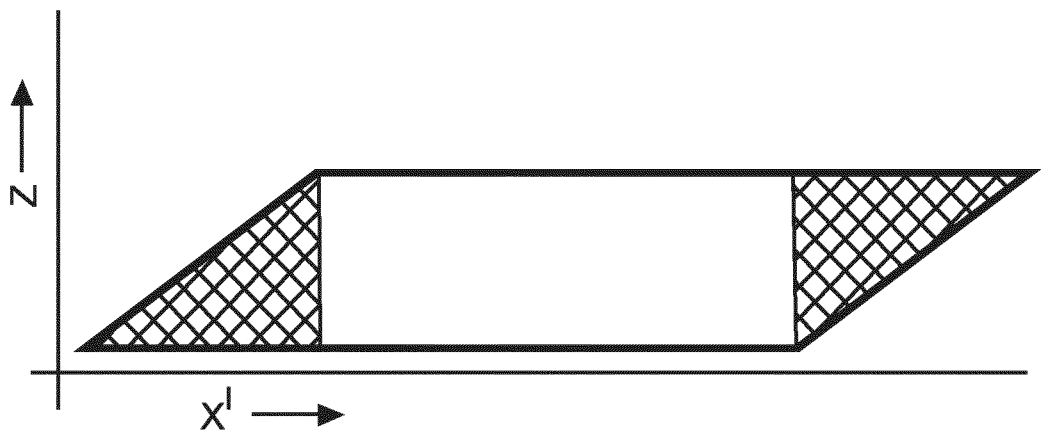
FIG. 13 shows schematically an example of oversampling.

FIG. 13 shows schematically an example of oversampling, where an image with enhanced depth of field is to be acquired for the central clear region. From the discussion relating to the previous figures, it is clear that image data at all available depths for a particular lateral point of the sample is generated once the projection of the detector at the sample, i.e. cross-section 5, has completely scanned past that point. In other words, the first part of the detector acquires image data at one extreme depth and when the sample has been moved sufficiently, the last part of the detector will then acquire image data at the other extreme depth. Intermediate parts of the detector will acquire image data at intermediate depths. However, this means that to scan a particular region over all available depths the projection of the detector must start just off to one side of the region to be scanned and finish just off the other side of the region to be scanned, as shown in FIG. 13. In other words, there is a certain amount of oversampling at either end of a region to be scanned. With respect to the discussion relating to FIG. 11, it can then easily be determined what such oversampling is required to be.

Figure 14:
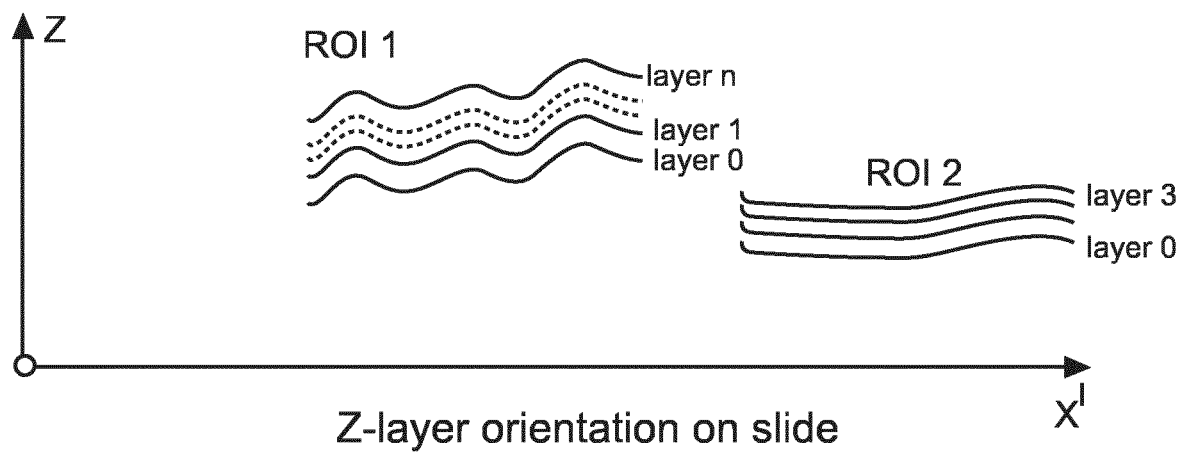
FIG. 14 shows schematically a number of imaged regions or layers.

FIG. 14 shows schematically a number of imaged regions or layers. In other words, each layer corresponds to what each TDI block (or blocks) images at a particular depth over the depth of focus of the microscope. As previously discussed, the tissue slide assembly may be misaligned, or the sample to be imaged may vary significantly over the depth direction. Therefore, prior to acquiring imagery to be used in generating a synthetic 2-D image with an enhanced depth of field of a biological sample, a relatively low resolution image of the tissue slide assembly is obtained. This is used to estimate the z-position (depth) of the tissue volume. In other words, at one or more locations (X', Y) the optimal focus (Z) is determined. Then, during acquisition of the imagery that generates a synthetic 2-D image with enhanced depth of field in a streaming mode, at each position the objective lens is moved appropriately along the optical axis O (or sample moved along the optical axis) and multiple TDIs are activated for acquisition of the data discussed above. In an example, rather than changing the position of the section 5 through movement of the objective lens or sample stage, the positions of the TDIs are moved up and down the detector as required. In this case the section 5 can scan at a constant depth, but different parts of the detector can acquire data. Alternatively, rather than obtaining a prior low resolution image a self focusing (autofocusing) sensor can be utilised as described for example in WO2011/161594A1. In such autofocusing configuration, the detector as shown in FIG. 12 can itself be configured as autofocusing sensor, or a separate autofocusing sensor can be utilised. This means that every position that image data is being acquired for generation of the image of enhanced depth of focus, the position of the sample can be determined and TDIs activated as required. The result is shown in FIG. 14 which indicates that depths within the sample being imaged by separate TDIs during the scan. As discussed, at each lateral position the enhanced image will be generated such that a feature at a particular depth is present in the synthetic enhanced image, where features at different depths (and hence in different layers) are then present in the resultant enhanced image. As discussed above, the enhanced image is generated without all of the separate images having to be saved, rather only a working image is saved and compared to the image just acquired thereby enabling an image with enhanced depth of field to be generated on the fly, without a large image buffer being required.

In this manner, the system can generate an image on the fly that can have multiple pathological features in focus, while those features are at different depths within the sample.

Figure 15:
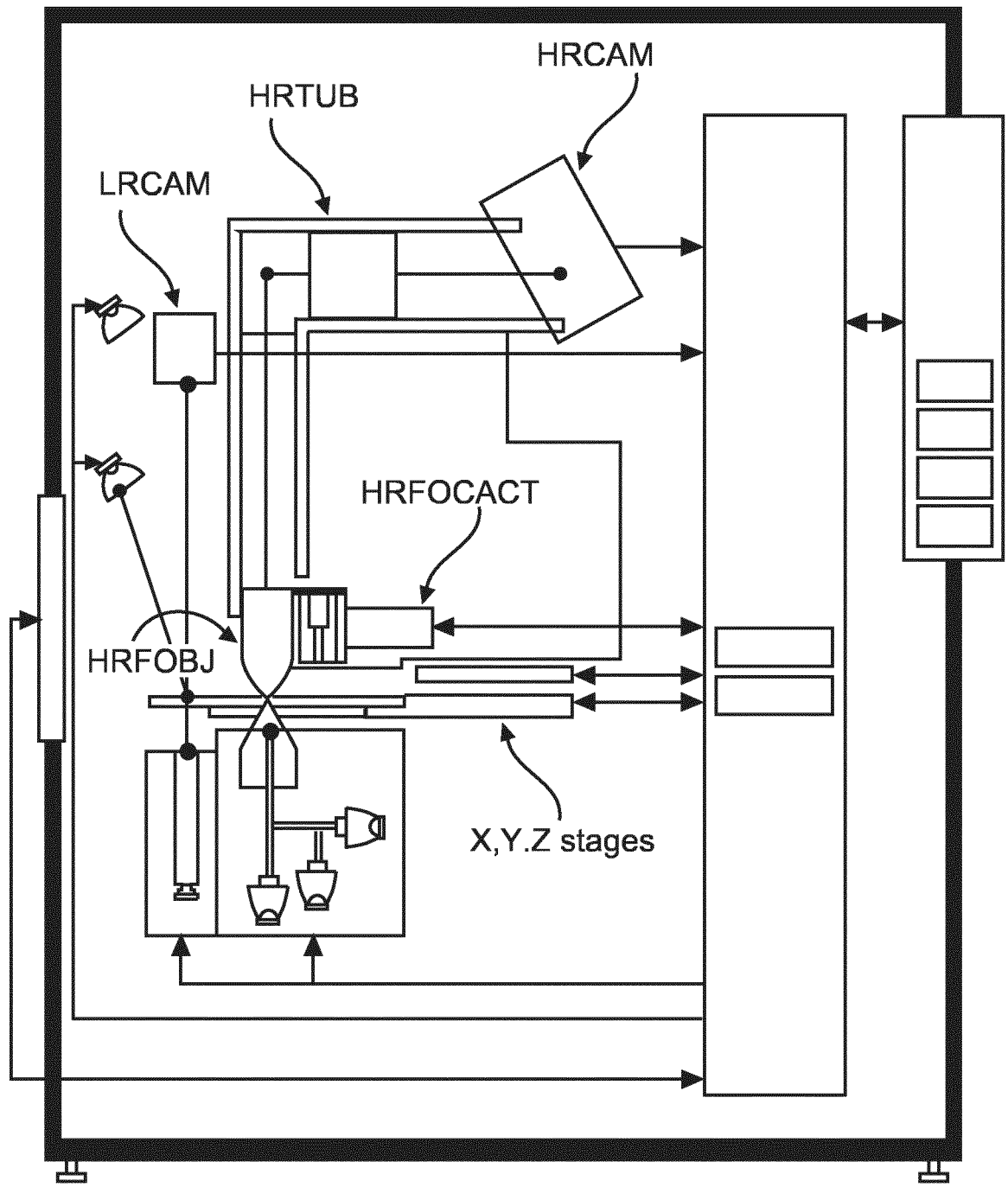
FIG. 15 shows schematically an example of a system for generating a synthetic 2D image with an enhanced depth of field of a biological sample.

FIG. 15 shows schematically an example of a system for generating a synthetic 2D image with an enhanced depth of field of a biological sample. In overview, the stages can move the sample horizontally and vertically. The low resolution camera LRCAM acquires the prior scan to determine the approximate position of the sample to be imaged across the tissue slide assembly. During the image acquisition for generation of the image with an enhanced depth of field, objective lens (HROBJ) and tube lens (HRTUB) are utilized as discussed previously. HRCAM is a camera, containing the tilted sensor as discussed. The objective lens (HROBJ) can be moved in the depth direction by the focus actuator (HRFOCACT). The global function of the microscope scanner is therefore as follows: A slide is put on the scanner's stage (STAGE), then the low-resolution camera (LRCAM) makes an image of the slide before scanning the tissue on the slide in a high resolution. This LR-image is used to, among other things, derive the region(s) of interest, i.e. to find the area(s) on the slide that needs to be scanned. Each region of interest is scanned by means of performing one or more scan passes with the high-resolution camera (HRCAM). The focus distance is measured via the HRCAM and controlled automatically via the focus actuator (HRFOCACT). During the scanning procedure the HR-image is transferred from the scanner to a destination (e.g. IMS) via the Ethernet interface (GbE).

Figure 16:
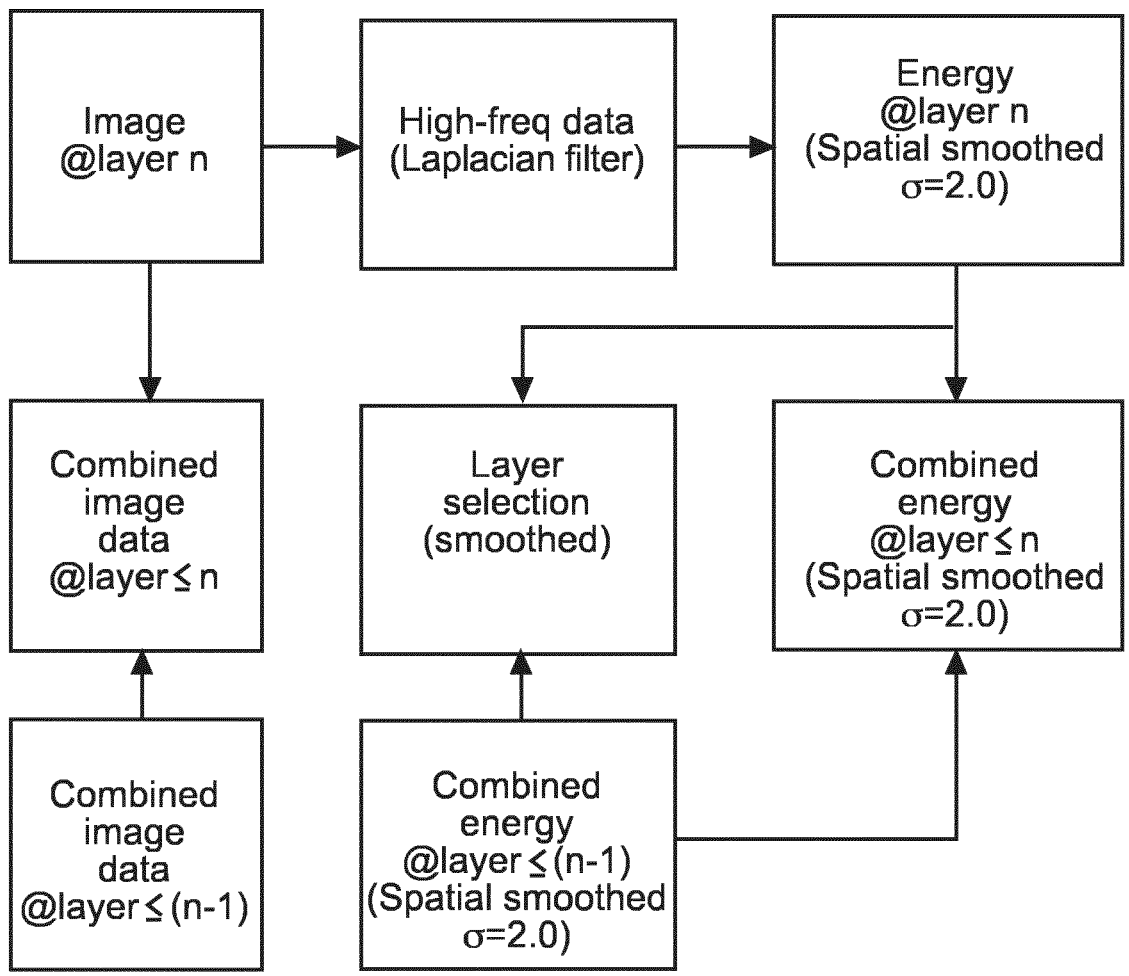
FIG. 16 shows an example workflow for focus stacking.

Focus stacking was briefly introduced with reference to FIG. 5. In FIG. 16 an example workflow for focus staking used in generating a synthetic image with enhanced depth of field is shown. For ease of explanation, focus stacking is described with respect to a system acquiring data as shown in FIG. 8, however it has applicability for a tilted detector that provides an oblique cross section. In the discussion that follows, a layer, as discussed previously, relates to what the microscope scanner is imaging at a particular depth in a sample over a depth of focus at that depth. Here, because the explanation relates to a non-tilted detector the layer is at the same depth within the sample, but as discussed this focus stacking process equally applies to a tilted detector and oblique cross section over which data is acquired. Therefore, the image of layer n is acquired. Firstly, the amount of energy of the input image, acquired at z-position n, is determined. The amount of energy is determined by applying a high-pass filter (i.e. a Laplacian filter), followed by a smoothing operation (to reduce the amount of noise). Secondly, this calculated amount of energy of layer n is compared with the energy of layer$\leq$(n−1). For every individual pixel, it is determined if the current layer (i.e. image data of layer n), or the combined result (i.e. combined image data of layer$\leq$(n−1)—the working image as discussed previously) should be used; the result of this is the "Layer selection" of FIG. 16. Thirdly, two buffers have to be stored, namely the combined image data (i.e. image data of layer$\leq$n) and the combined energy data (i.e. of layer$\leq$n). Then, the next layer can be scanned, and the process repeats, until the last layer has been acquired and processed. It is to be noted that layer selection (i.e. which part you select from which layer) is used to combine the information from the image data of layer n and the image data of combined image$\leq$(n−1), as well as for the energy.

Therefore, in an example a tilted sensor is combined with focus stacking, in streaming mode. Then, it is no longer needed to store the intermediate results completely (i.e. image data of layer$\leq$(n−1) and energy of layer$\leq$(n−1)), but only a limited history of the image and energy data is needed, determined by the footprint of the used image filters (i.e. high-pass filter and smoothing filter). Each time a new (slanted) image is acquired by the slanted sensor, the energy per row (i.e. per z-position) of this image is determined; the slanted image, as discussed previously, is in a plane in Y (rows of the image) and X'/Z (columns of the image). These energy values are compared with the previous acquisitions. The comparison is performed for matching (x',y) positions, in other words at a local level (enough pixels for which the above energy analysis can be applied) and not for the whole line image as one image. If more focus energy is found, the image data is updated. Once all z-positions of a (x',y) position have been evaluated, the (combined—"working") image data can be transferred. This removes the need to store tens of GBs of intermediate results, while the final result (i.e. the enhanced depth of focus layer) is (still) available directly after scanning the last part of the tissue sample.

Figure 17:
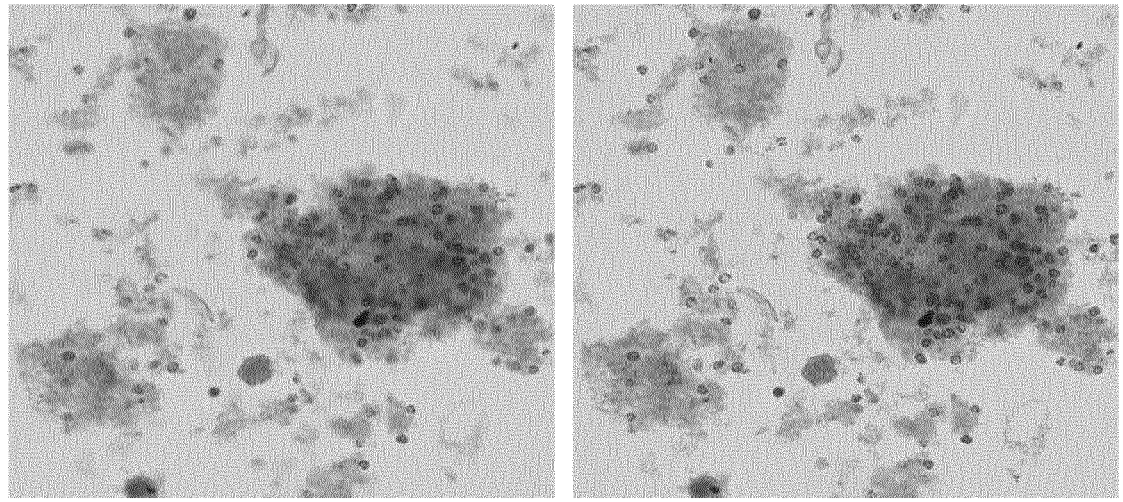
FIG. 17 shows an example image on the left that does not have an enhanced depth of field, and on the right a synthetic 2D image with enhance depth of field is shown.
Figure 18:
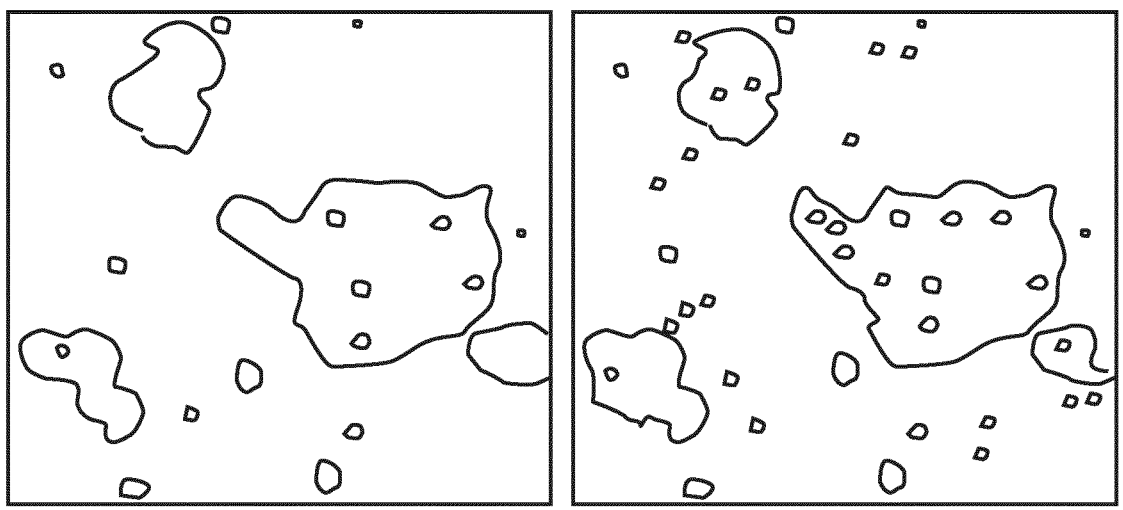
FIG. 18 shows schematically the content of the images shown in FIG. 17.

FIGS. 17 and 18 show the final result, the image with an enhanced depth of field, which is the right hand image. The left hand image is a single image at one depth, as would be acquired by a conventional microscope. In the right hand image more features, cells, are in focus as compared to that acquired conventionally.

Alternatives

In the above process, for every pixel the optimal image layer is determined by the amount of energy (i.e. a high-pass filter). A possible implementation is that the different colour channels are merged (i.e. using a RGB2Y operation), before determining the high frequency information. As an alternative, pathological information (i.e. from an external source like the LIS/HIS or determined by image analysis) can be used to focus more on a specific colour. This can even be combined with an extra colour separation step or colour deconvolution step. Then, the optimal layer can locally be determined by the amount of energy using one (or multiple) specific colour stain(s) (e.g. focussing on the chromatin pattern of the nuclei). Furthermore, adding a colour separation step can result in the use of different 2D smoothing kernels. For example, nuclei contain much smaller details than the cytoplasm and therefore benefits from smaller smoothing kernels ($\sigma<2$).

In the above process a Laplacian high-frequency filter is used. As an alternative, the acquired data can be translated to the wavelet domain, where the high frequency sub band can be used as a representation of the energy. This can be combined with the iSyntax compression (see for example U.S. Pat. No. 6,711,297B1 and U.S. Pat. No. 6,553,141).

In the above process, the conversion to a single image layer having enhanced depth of field is applied before sending the image to the server. It is also possible that the conversion to a single layer is performed on the server, such that output of the sensor is directly transferred to the server.

Instead of selecting the optimal layer for every pixel, it is also possible that the pixel values of multiple layers are combined using a particular weighting, based on the distribution of the energy of the pixels.

Instead of selecting the optimal layer for every pixel, it is also possible to sum all pixels of the tilted sensor of the same z-direction. The result is a blurred sum images which can subsequently be filtered with a simple band filter. For information relating to the summing of digital pictures see U.S. Pat. No. 4,141,032A.

This method can also be used to measure the thickness of the tissue, as this is related to the energy of each layer.

In another exemplary embodiment, a computer program or computer program element is provided that is characterized by being configured to execute the method steps of the method according to one of the preceding embodiments, on an appropriate system.

The computer program element might therefore be stored on a computer unit, which might also be part of an embodiment. This computing unit may be configured to perform or induce performing of the steps of the method described above. Moreover, it may be configured to operate the components of the above described apparatus. The computing unit can be configured to operate automatically and/or to execute the orders of a user. A computer program may be loaded into a working memory of a data processor. The data processor may thus be equipped to carry out the method according to one of the preceding embodiments.

This exemplary embodiment of the invention covers both, a computer program that right from the beginning uses the invention and computer program that by means of an update turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A system for generating a synthetic 2D image with an enhanced depth of field of a biological sample, the system comprising:

a microscope-scanner; and a processing unit;

wherein the microscope-scanner is configured to acquire first image data at a first lateral position of the biological sample and second image data at a second lateral position of the biological sample;

wherein the microscope-scanner is configured to acquire third image data at the first lateral position and fourth image data at the second lateral position, wherein the third image data is acquired at a depth that is different than that for the first image data and the fourth image data is acquired at a depth that is different than that for the second image data;

wherein the processing unit is configured to generate first working image data for the first lateral position, the generation comprising processing the first image data and the third image data by a focus stacking algorithm, and the processing unit is configured to generate second working image data for the second lateral position, the generation comprising processing the second image data and the fourth image data by the focus stacking algorithm to generate second working image data for the second lateral position; and wherein the processing unit is configured to combine the first working image data and the second working image data, during acquisition of image data, to generate the synthetic 2D image with an enhanced depth of field of the biological sample.

2. The system of claim 1, wherein the microscope-scanner comprises a detector configured to acquire image data of an oblique section of the biological sample.

3. The system of claim 2, wherein the detector is a 2D detector comprising at least two active regions.

4. The system of claim 1, wherein the microscope-scanner is configured to acquire image data of a first section of the biological sample to acquire the first image data and the second image data, and wherein the microscope-scanner is configured to acquire image data of a second section of the biological sample to acquire the third image data and the fourth image data.

5. The system of claim 1, wherein the microscope-scanner is configured to acquire the first image data at the first lateral position of the biological sample and at a first depth and to simultaneously acquire the second image at the second lateral position of the biological sample and at a second depth, wherein the first depth is different than the second depth; and wherein the microscope-scanner is configured to acquire the third image data at the first lateral position and at a third depth and to simultaneously acquire the fourth image data at the second lateral position and at a fourth depth, wherein the third depth is different than the fourth depth.

6. The system of claim 1, wherein the microscope-scanner has a depth of focus at the first lateral position and at the second lateral position neither of which is greater than a distance in depth between the depth at which the first image data is acquired and the depth at which the second image data is acquired.

7. The system of claim 1, wherein the sample is at a first position relative to an optical axis of the microscope for acquisition of the first image data and the second image data and the sample is at a second position relative to the optical axis for acquisition of the third image data and the fourth image data.

8. The system of claim 1, wherein the image data comprises a plurality of colours, and wherein the processing unit is configured to process image data by the focus stacking algorithm on the basis of the image data that comprises one or more of the plurality of colours.

9. A method for generating a synthetic 2D image with an enhanced depth of field of a biological sample comprising:

a) acquiring with a microscope-scanner first image data at a first lateral position of the biological sample and acquiring with the microscope-scanner second image data at a second lateral position of the biological sample;

b) acquiring with the microscope-scanner third image data at the first lateral position and acquiring with the microscope-scanner fourth image data at the second lateral position, wherein the third image data is acquired at a depth that is different than that for the first image data and the fourth image data is acquired at a depth that is different than that for the second image data;

e) generating first working image data for the first lateral position, the generation comprising processing the first image data and the third image data by a focus stacking algorithm; and f) generating second working image data for the second lateral position, the generation comprising processing the second image data and the fourth image data by the focus stacking algorithm; and l) combining the first working image data and the second working image data, during acquisition of image data, to generate the synthetic 2D image with an enhanced depth of field of the biological sample.

10. The method of claim 9, wherein step a) comprises acquiring the first image data at the first lateral position of the biological sample and at a first depth and simultaneously acquiring the second image at the second lateral position of the biological sample and at a second depth, wherein the first depth is different than the second depth; and wherein step b) comprises acquiring the third image data at the first lateral position and at a third depth and simultaneously acquiring the fourth image data at the second lateral position and at a fourth depth, wherein the third depth is different than the fourth depth.

11. The method of claim 9, wherein the method comprises:

c) calculating a first energy data for the first image data and calculating a third energy data for the third image data; and d) calculating a second energy data for the second image data and calculating a fourth energy data for the fourth image data; and wherein step e) comprises selecting either the first image data or the third image data as the first working image, the selecting comprising a function of the first energy data and third energy data; and wherein step f) comprises selecting either the second image data or the fourth image data as the second working image, the selecting comprising a function of the second energy data and fourth energy data; and wherein frequency information in the image data is representative of energy data.

12. The method of claim 11, wherein the method comprises:

g) generating a first working energy data as the first energy data if the first image data is selected as the first working image or generating the first working energy data as the third energy data if the third image data is selected as the first working image; and h) generating a second working energy data as the second energy data if the second image data is selected as the second working image or generating the second working energy data as the fourth energy data if the fourth image data is selected as the second working image is the fourth image data.

13. The method of claim 9, wherein the method further comprises:
   i) acquiring fifth image data at the first lateral position and acquiring sixth image data at the second lateral position, wherein the fifth image data is acquired at a depth that is different than that for the first and third image data and the sixth image data is acquired at a depth that is different than that for the second and fourth image data; and
   j) generating new first working image data for the first lateral position, the generation comprising processing the fifth image data and the first working image data by the focus stacking algorithm, wherein the new first working image data becomes the first working image data; and
   k) generating new second working image data for the second lateral position, the generation comprising processing the sixth image data and the second working image data by the focus stacking algorithm, wherein the new second working image data becomes the second working image data.

14. A non-transitory computer readable medium having stored a program which, when executed by a processor, causes the processor to:
   a) acquire with a microscope-scanner first image data at a first lateral position of the biological sample and acquire with the microscope-scanner second image data at a second lateral position of the biological sample;
   b) acquire with the microscope-scanner third image data at the first lateral position and acquiring with the microscope-scanner fourth image data at the second lateral position, wherein the third image data is acquired at a depth that is different than that for the first image data and the fourth image data is acquired at a depth that is different than that for the second image data;
   e) generate first working image data for the first lateral position, the generation comprising processing the first image data and the third image data by a focus stacking algorithm; and
   f) generate second working image data for the second lateral position, the generation comprising processing the second image data and the fourth image data by the focus stacking algorithm; and
   l) combine the first working image data and the second working image data, during acquisition of image data, to generate the synthetic 2D image with an enhanced depth of field of the biological sample.

15. The non-transitory computer readable medium of claim 14, wherein the program causes the processor to perform a) by acquiring the first image data at the first lateral position of the biological sample and at a first depth and simultaneously acquiring the second image at the second lateral position of the biological sample and at a second depth, wherein the first depth is different than the second depth; and wherein the program causes the processor to perform b) by acquiring the third image data at the first lateral position and at a third depth and simultaneously acquiring the fourth image data at the second lateral position and at a fourth depth, wherein the third depth is different than the fourth depth.

16. The non-transitory computer readable medium of claim 14, wherein the program further causes the processor to perform:
   c) calculate a first energy data for the first image data and calculate a third energy data for the third image data; and
   d) calculate a second energy data for the second image data and calculate a fourth energy data for the fourth image data; and
      wherein the program causes the processor to perform e) by selecting either the first image data or the third image data as the first working image, the selecting comprising a function of the first energy data and third energy data; and
      wherein the program causes the processor to perform f) by selecting either the second image data or the fourth image data as the second working image, the selecting comprising a function of the second energy data and fourth energy data; and
      wherein frequency information in image data is representative of energy data.

17. The non-transitory computer readable medium of claim 16, wherein the program further causes the processor to:
   g) generate a first working energy data as the first energy data if the first image data is selected as the first working image or generate the first working energy data as the third energy data if the third image data is selected as the first working image; and
   h) generate a second working energy data as the second energy data if the second image data is selected as the second working image or generate the second working energy data as the fourth energy data if the fourth image data is selected as the second working image is the fourth image data.

18. The non-transitory computer readable medium of claim 14, wherein the program further causes the processor to:
   i) acquire fifth image data at the first lateral position and acquire sixth image data at the second lateral position, wherein the fifth image data is acquired at a depth that is different than that for the first and third image data and the sixth image data is acquired at a depth that is different than that for the second and fourth image data; and
   j) generate new first working image data for the first lateral position, the generation comprising processing the fifth image data and the first working image data by the focus stacking algorithm, wherein the new first working image data becomes the first working image data; and
   k) generate new second working image data for the second lateral position, the generation comprising processing the sixth image data and the second working image data by the focus stacking algorithm, wherein the new second working image data becomes the second working image data.

* * * * *